United States Patent [19]

Oba et al.

[11] Patent Number: 4,706,141
[45] Date of Patent: Nov. 10, 1987

[54] VIDEO TAPE RECORDER WITH FIRST AND SECOND LOADING POSITIONS

[75] Inventors: Seisuke Oba; Tsutomu Mikami; Hideyuki Suzuki; Mitsuhiro Shimada; Tadashi Suzuki, all of Tokyo, Japan

[73] Assignee: Sony Corporation, Tokyo, Japan

[21] Appl. No.: 752,733

[22] Filed: Jul. 8, 1985

[30] Foreign Application Priority Data

Sep. 29, 1984 [JP] Japan ................... 59-206067

[51] Int. Cl.⁴ .................. G11B 15/66; G11B 17/04
[52] U.S. Cl. ................................. 360/96.5; 360/93; 360/96.6; 369/12
[58] Field of Search ............ 360/93, 96.1, 96.5, 360/96.6; 369/10–12

[56] References Cited

FOREIGN PATENT DOCUMENTS

| 2100433 | 8/1971 | Fed. Rep. of Germany . | |
| 2100996 | 8/1971 | Fed. Rep. of Germany . | |
| 3100379 | 1/1982 | Fed. Rep. of Germany . | |
| 3408751 | 9/1984 | Fed. Rep. of Germany . | |
| 56-80806 | 7/1981 | Japan ................... | 360/96.6 |
| 2149187 | 6/1985 | United Kingdom . | |

Primary Examiner—John H. Wolff
Attorney, Agent, or Firm—Vorys, Sater, Seymour and Pease

[57] ABSTRACT

A video tape recorder, according to the present invention, comprises a mechanical chassis supporting a mechanism for recording and reproducing video signals on a magnetic video tape housed in a cassette. The mechanical chassis moves essentially on a horizontal plane at a load position and an ejecting position. At the load position, the mechanical chassis projects frontward from an outer cover housing of the video tape recorder for loading and/or ejecting a magnetic video tape cassette. Preferably, the recorder has at least two load positions and can perform recording and/or reproduction at either load position. At a first load position, the mechanical chassis is housed within the internal space of the recorder housing. At second load position, the mechanical chassis projects at least partway from the recorder housing. A push-button operated controller for operating the recorder is also disclosed.

27 Claims, 19 Drawing Figures

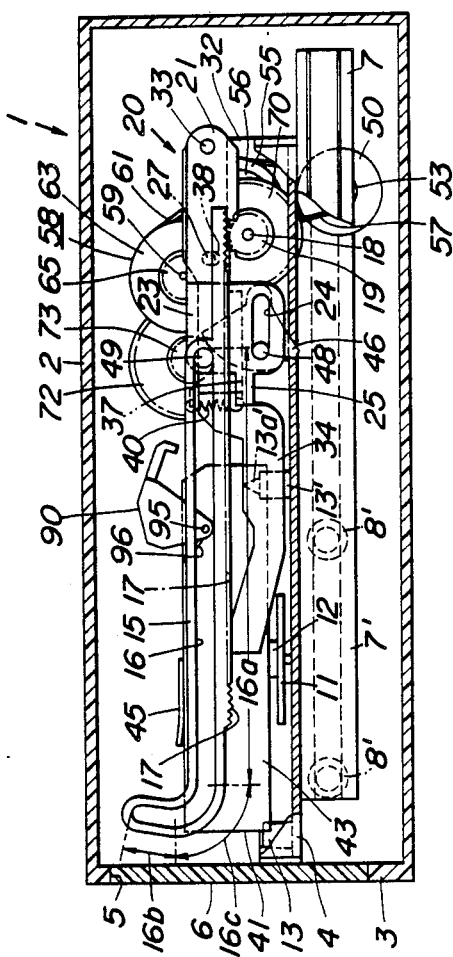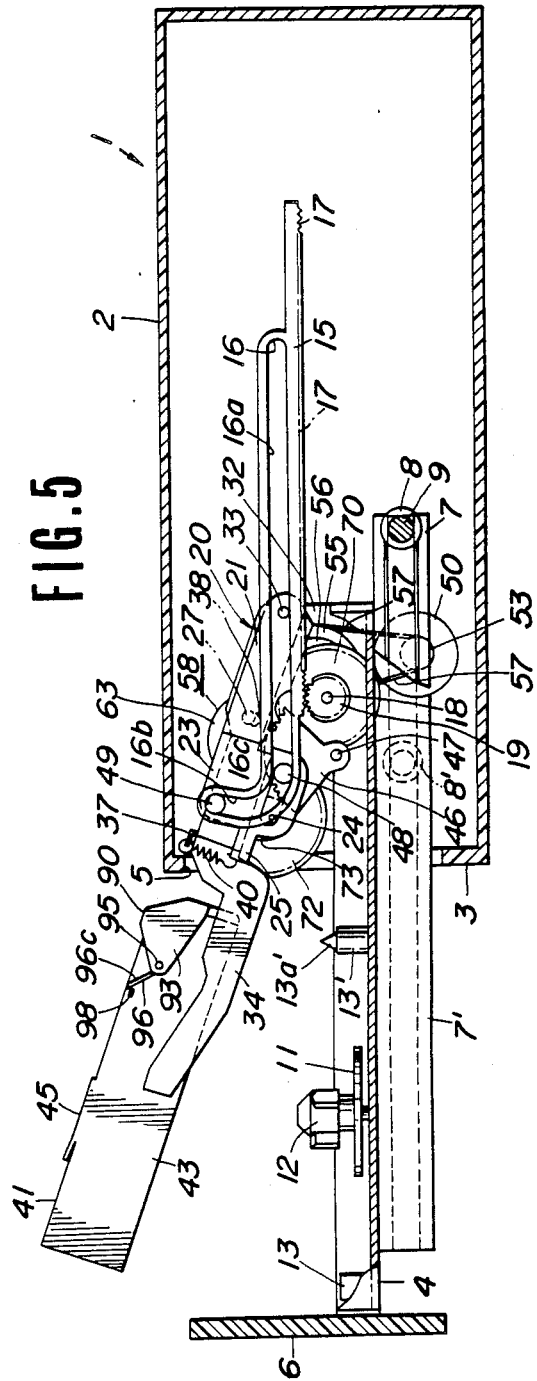

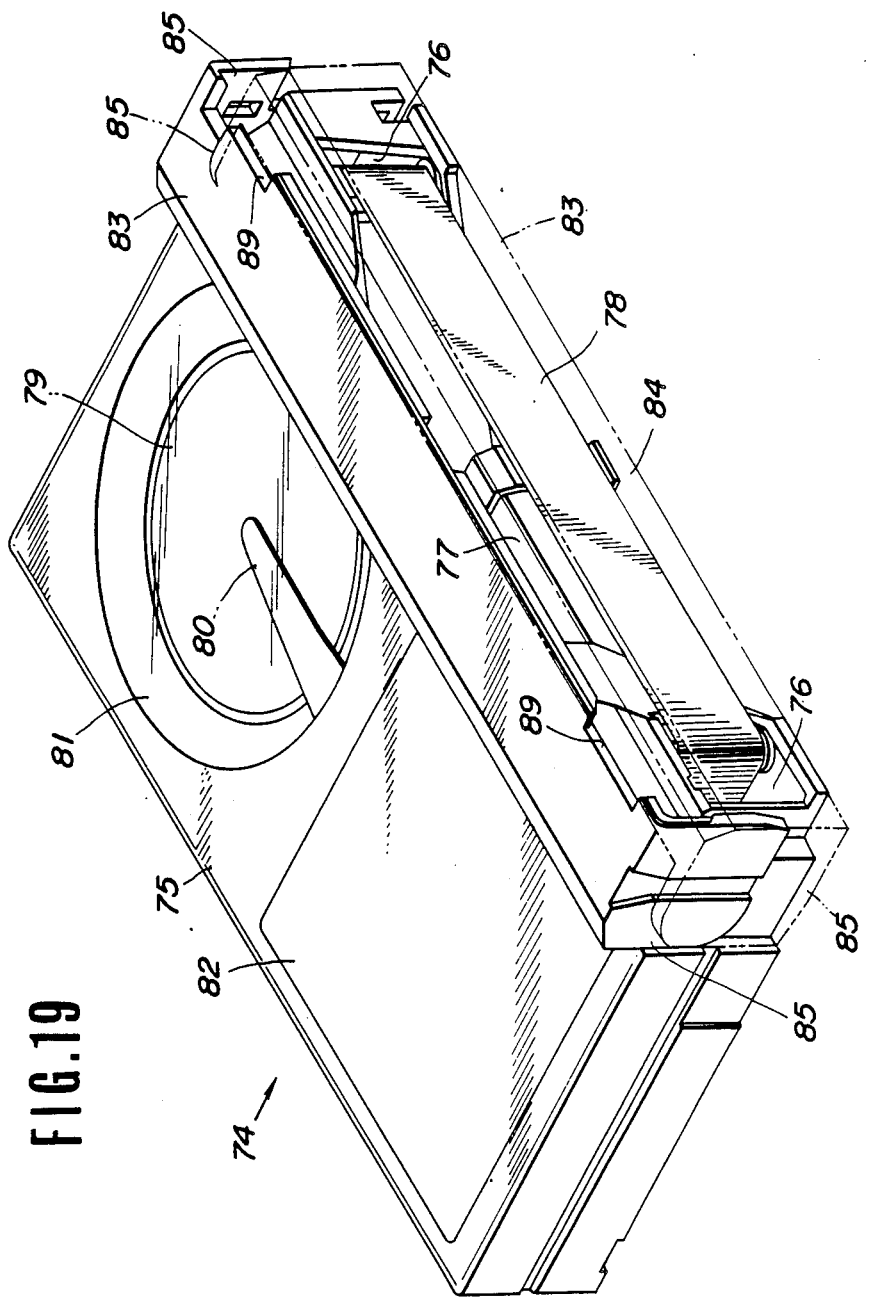

VIDEO TAPE RECORDER WITH FIRST AND SECOND LOADING POSITIONS

BACKGROUND OF THE INVENTION

1. Field of the Invention

The present invention relates generally to a video tape recorder with a novel tape-loading system. More particularly, the invention relates to a compact video tape recorder employing a magnetic tape cassette for recording and reproducing video signals, which minimizes the space required for tape-loading.

2. Description of the Prior Art

In the recent years, video tape recorders, particularly home-use video tape recorders, have become exceedingly popular. Due to the success of the home-use video tape recorder, the need has arisen to make the recorder more and more compact. This need is becoming more urgent as the market continues to grow.

In the prior art, video tape recorders employ various tape-loading systems, such as top-loading systems of front-loading systems. These conventional tape-loading systems have the drawback of making video tape recorders bulky. Take for example, video tape recorders employing the top-loading system which has a cassette holder movable vertically between a load position and an ejecting position. At the ejecting position, the cassette holder projects upwards from the upper surface of a recorder housing to allow insertion or removal of a magentic video tape cassette. This requires a certain amount of space above the recorder housing for the cassette holder Conventional top-loading systems require some additional space above the recorder housing to allow for manual actuation of the cassette holder to the load position.

On the other hand, in conventional front-loading systems, an elevator mechanisim moves the cassette holder between the load position and the ejecting position. The elevator mechanism drives the cassette holder vertically toward and away from a front cassette receptacle formed in the recorder housing. Since the cassette holder moves between the load position and the ejecting position within the recorder housing, the recorder housing must have sufficient internal space for the vertical travel of the cassette holder. This keeps the recorder housing bulky and limits possible reduction of the height of the housing.

The present invention is intended to resolve problems encountered in conventional tape-loading systems and thus to reduce the space required for tape-loading.

SUMMARY OF THE INVENTION

Therefore, it is a principle object of the present invention to provide a video tape recorder with a novel tape-loading system which requires less space for loading and ejecting a magnetic video tape cassette.

Another and more specific object of the present invention is to provide a video tape recorder with a tape-loading system which minimizes the vertical space required for loading and ejecting a video tape cassette.

A further object of the invention is to provide a video tape recorder which enables recording and reproduction in at least two positions of a cassette holder which handles a tape cassette.

In order to accomplish the aforementioned and other objects, a video tape recordeer, according to the present invention, comprises a mechanical chassis supporting a mechanism for recording and reproducing video signals on a magnetic video tape housed in a cassette. The mechanical chassis moves essentially on a horizontal plane at a load position and a ejecting position. At the load position, the mechanical chassis projects frontward from an outer cover housing of the video tape recorder for loading and/or ejecting a magnetic video tape cassette.

Preferably, the recorder has at least two load positions and can perform recording and/or reproduction at either load position. At a first load position, the mechanical chassis is housed within the internal space of the recorder housing. At second load position, the mechanical chassis projects at least partway from the recorder housing.

In another preferred arrangement, the mechanical chassis is connected to a driving mechanism which moves the mechanical chassis between the load and eject positions. The mechanical chassis driving mechanism is associated with one or more manually operable mode selectors and moves the mechanical chassis in response to operation of the mode selector.

In addition, the preferred arrangement of the video tape recorder includes a cassette holder cooperatively associated with the mechanical chassis. The cassette holder is positioned on the base of the mechanical chassis when the mechanical chassis is in its load position so as to hold the tape cassette in the load position. The cassette holder tilts away from the base when the mechanical chassis is moved to the ejecting position for inserting or removing the tape cassette.

According to one aspect of the invention, a video tape recorder comprises a recorder housing, a mechanical chassis on which a recorder mechanism for recording and reproduction is mounted, the recording mechanism being adapted to receive a video tape cassette including a video tape serving as recording medium, characterized in that the mechanical chassis can move horizontally between a first position in which it protrudes from the recorder housing to receive the video tape cassette and a second position housed within the recorder housing and in which the video tape is received by the recorder mechanism for recording and reproduction.

BRIEF DESCRIPTION OF THE DRAWINGS

The present invention will be understood more fully from the detailed description given herebelow and from the accompanying drawings of the preferred embodiment of the invention, which however, should not be taken to limit the invention to the specific embodiment, but are for explanation and understanding only.

FIG. 4 is a cross-section through the video tape recorder of FIG. 1, in which the mechanical chassis is in the same position as in FIG. 2;

FIG. 5 is a cross-section through the video tape recorder of FIG. 1, in which the mechanical chassis is in the same position as in FIG. 1;

FIG. 19 is a perspective view of a magnetic tape cassette applicable to the preferred embodiment of the video tape recorder of the invention.

DESCRIPTION OF THE PREFERRED EMBODIMENT

Figure 1:
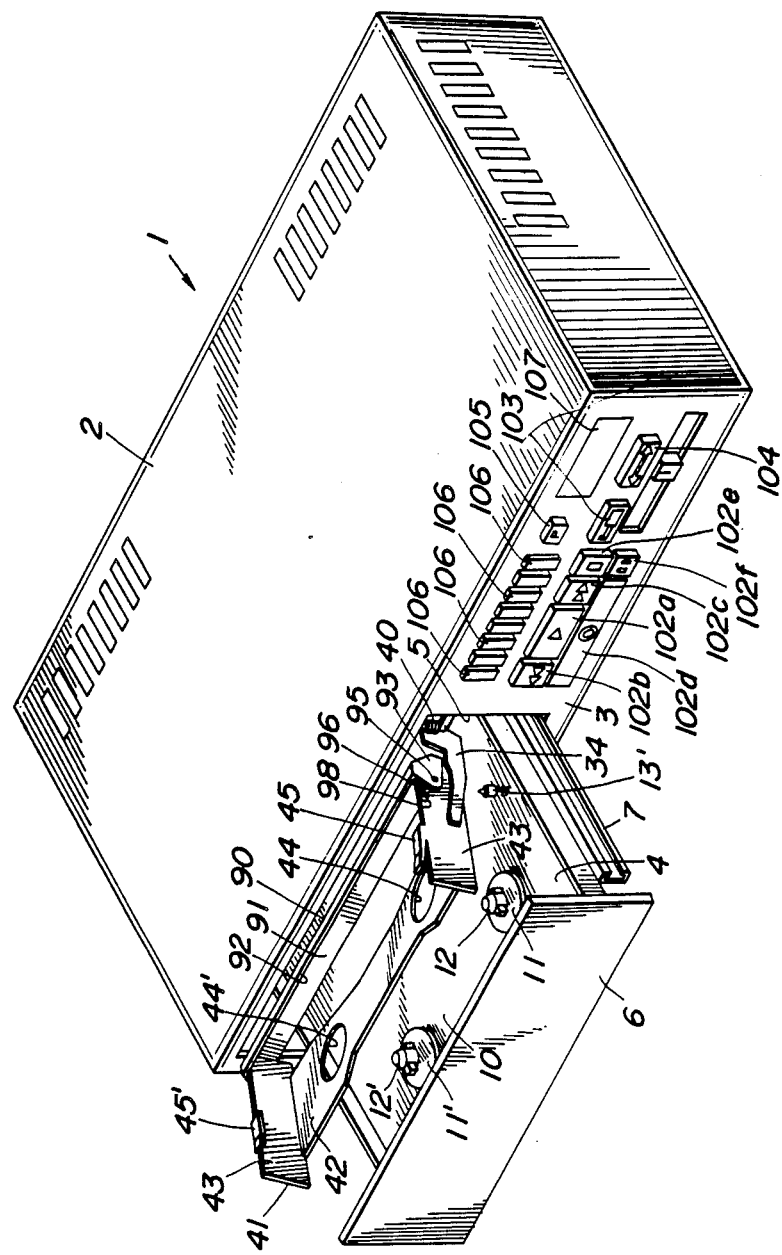
FIG. 1 is a perspective view of the preferred embodiment of a video tape recorder according to the present invention, in which a mechanical chassis is shown in an ejecting position.
Figure 2:
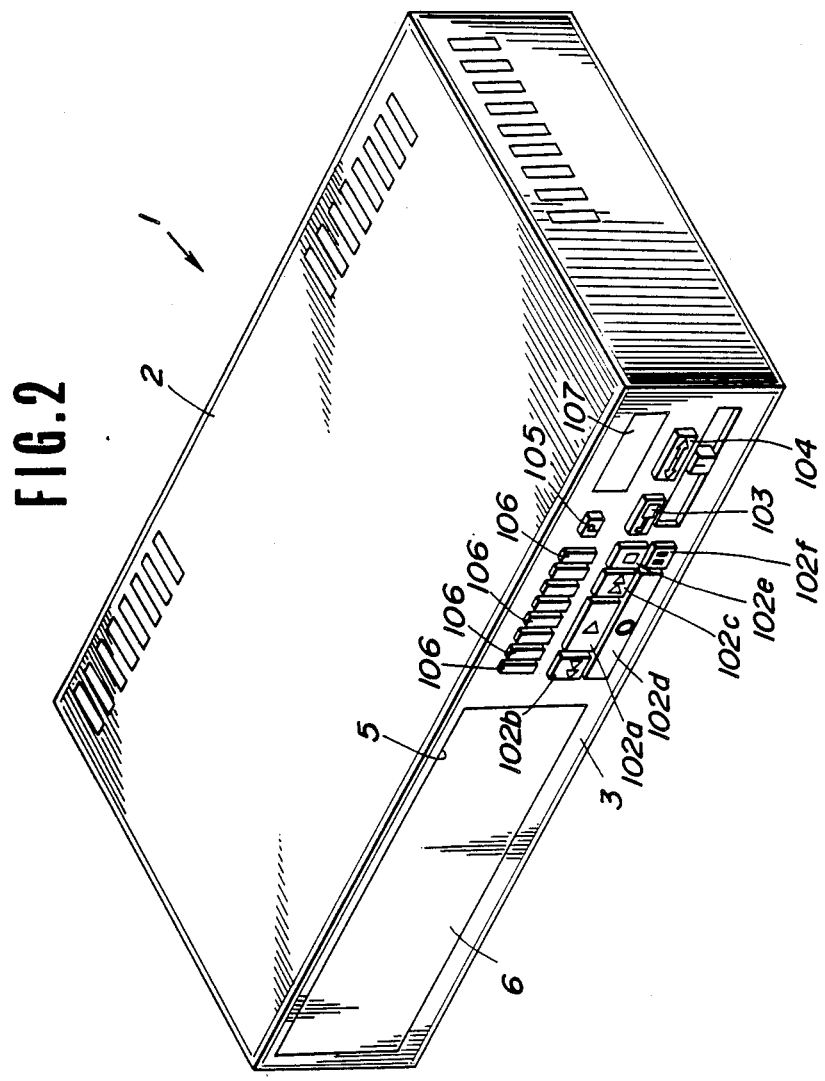
FIG. 2 is a perspective view of the video tape recorder of FIG. 1, showing the mechanical chassis in a load position within a recorder housing.
Figure 3:
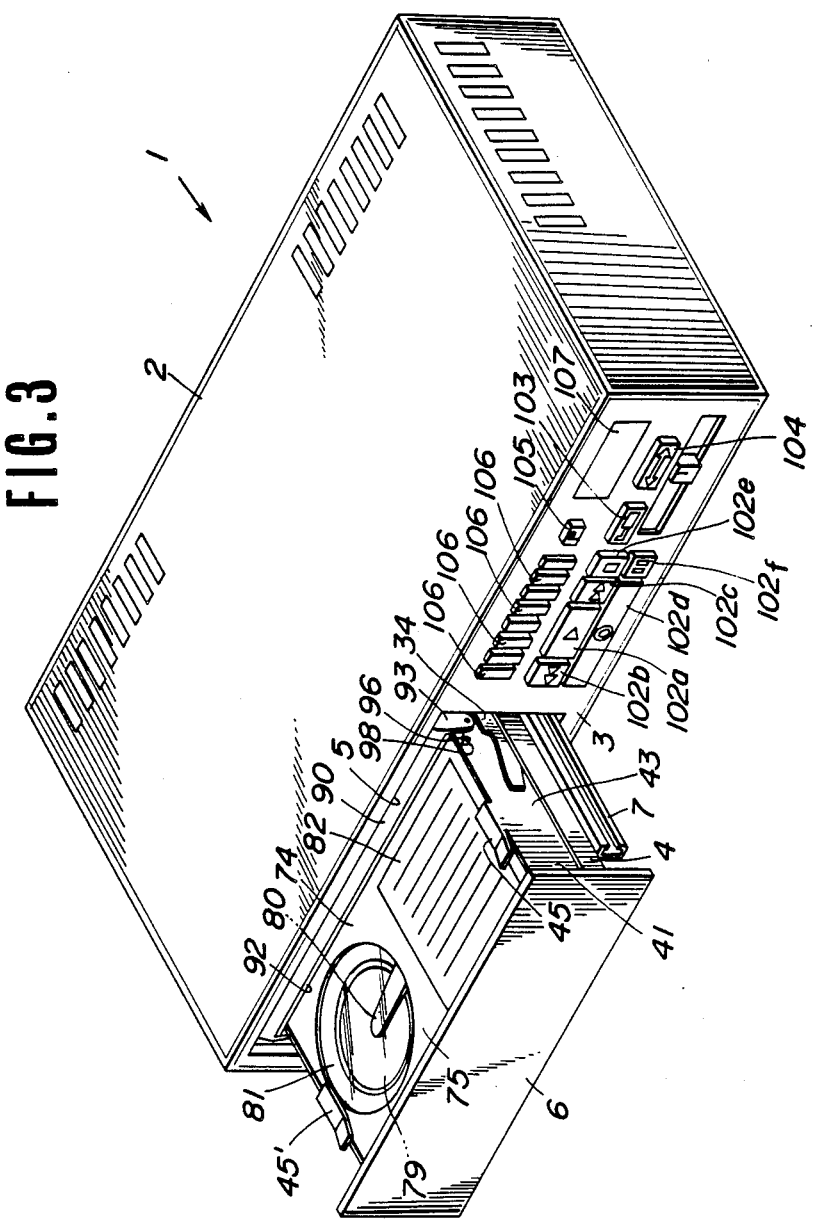
FIG. 3 is a perspective view of the video tape recorder of FIG. 1, showing the mechanical chassis in a load position partially outside of the recorder housing.
Figure 6:
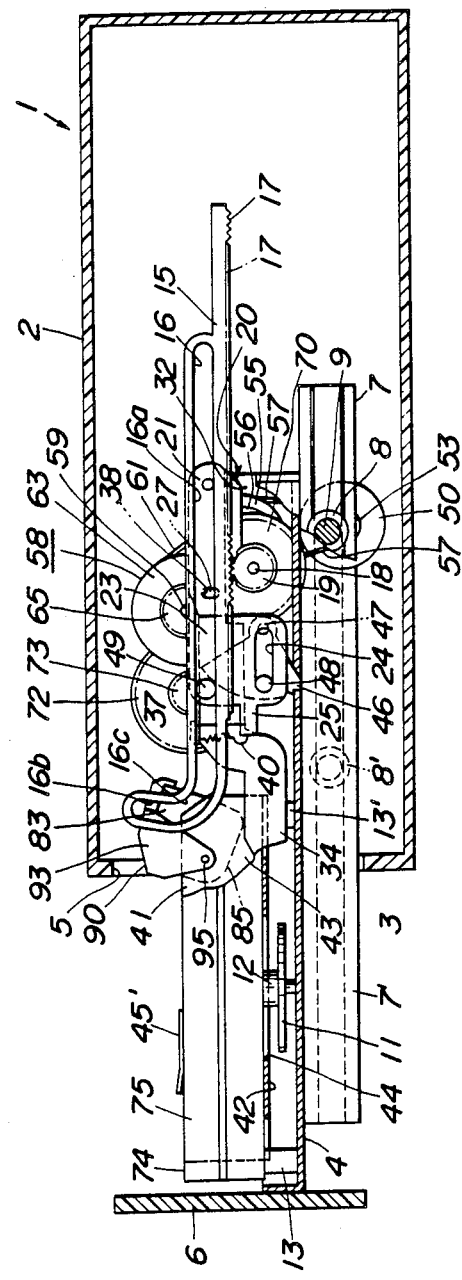
FIG. 6 is a cross-section through the video tape recorder of FIG. 1, wherein the mechanical chassis is in the same position as in FIG. 3.

Referring now to the drawings, particularly to FIGS. 1 to 6, the preferred embodiment of a video tape recorder 1 has a recorder casing 2 which is of generally box-shaped configuration. The recorder casing 2 defines an opening mouth 5 in its front panel 3. In the shown embodiment, the opening mouth 5 lies to the left of the longitudinal center axis of the recorder 1. A mechanical chassis 4 is movably disposed within the recorder housing 2 for movement between predetermined positions. In practice, the mechanical chassis 4 is movable between a fully pulled-out position at which a video tape cassette can be inserted or removed from the mechanical chassis, a position fully retracted into the recorder housing 2, and a position between the aforementioned two positions in which the front half of the mechanical chassis 4 is outside of the recorder housing 2. The first-mentioned, fully drawn-out position of the mechanical chassis will be referred to hereafter as an "eject position". The second-mentioned, fully retracted position of the mechanical chassis 4 will be referred to hereafter as a "first load position" and, the last-mentioned position, intermediate between the eject position and the first load position, wherein the front part of the mechanical chassis 4 protrudes from the opening mouth 5 of the recorder housing 2 but tape is loaded for recording and reproduction, will be referred to hereafter as a "second load position". In the drawings, FIGS. 1 and 4 show the mechanical chassis in the foregoing eject position. FIGS. 2 and 5 show the video tape recorder with the mechanical chassis 4 in the first load position. Similarly, FIGS. 3 and 6 show the video tape recorder 1 with the mechanical chassis 4 in the second load position.

A movable panel 6 is fixed to the front end of the mechanical chassis 4 for movement therewith. The movable panel 6 is so shaped as to seal the opening mouth 5 of the front panel 3 when the mechanical chassis 4 is in the foregoing first load position. Therefore, the movable panel 6 conforms to the opening mouth 5 in size and shape as shown in FIGS. 2 and 5.

The recorder housing 2 houses a system controller including one or more memories, control units and so forth, which will be described later. Also, although the drawings do not clearly show this, the per se known components necessary for recording and/or reproducing information on video tape are housed in the recorder housing 2.

An array of a plurality of manually operable push buttons is arranged beside the opening mouth 5 on the front panel 3. Although the drawings, particularly FIGS. 1 to 3, show a specific arrangement of the array of push buttons to the right of the opening mouth, it is, of course, possible to change the positions thereof.

The mechanical chassis 4 is based on a generally square plate. A pair of guide rails 7 are provided along both sides of the square mechanical chassis 4. The guide rails 7 are of an essentially C-channel-shaped configuration with the openings facing away from the chassis 4. The guide rails 7 each engage a pair of guide rollers 8 and 8' rotatably attached to the recorder housing 2 by means of roller shafts 9 and 9' protruding from the inner walls of the recorder housing. The guide rollers 8 are disposed near the opening mouth 5 of the recorder housing 2 on opposite sides of the mechanical chassis 4 to engage the corresponding guide rails 7. The guide rollers 8' lie in the same horizontal plane as the guide rollers 8 but are nearer the front end of the recorder housing, as shown in FIGS. 4 to 6. With this arrangement, the mechanical chassis 4 is free to move among the foregoing eject position, first load position and second load position. The guide rails 7 and the guide rollers 8 and 8' are coupled to constitute a mechanical chassis guide mechanism.

The mechanical chassis 4 supports a recording and reproduction apparatus generally referred to hereafter as "recorder mechanism 10". The recorder mechanism 10 includes all of the components necessary for driving the video tape and recording and reproducing information on a magnetic video tape cassette 74 which will be described later. The recorder mechanism, thus, includes a pair of reel mounts 11 and 11' disposed in the front half of the mechanical chassis 4 and projected upwards from the upper surface of the chassis. The reel mounts 11 and 11' have reel hub shafts 12 and 12' on their upper surfaces. The reel mounts 11 and 11' and the reel hub shafts 12 and 12' are associated with reel shafts (not shown) driven by a drive mechanism described later. The recorder mechanism 10 also includes positioning pins 13 and 13'. The positioning pins 13 are carefully positioned near the front corners of the mechanical chassis. On the other hand, the positioning pins 13' are located further back and closer to the edges of the mechanical chassis 4. The positioning pins 13' have conical tops 13a'. The positioning pins 13 and 13' are designed to engage positioning holes formed in the video tape cassette 74 for accurate positioning of the latter with respect to the mechanical chassis when the cassette is lowered onto the chassis for loading prior to recording or reproduction.

The recorder mechanism further includes a rotary head assembly 14 which comprises a rotary drum 14a and a stationary drum 14b. As is well known, the rotary drum 14a mounts one or more magnetic video heads in a per se well-known manner for rotation therewith. Although the drawings do not clearly show, the recorder mechanism also includes heads such as an audio head, a control head and an eraser head, a tape guide mechanism including a plurality of tape guide posts for defining a tape run path, a tape loading mechanism for drawing the video tape out of the video tape cassette and winding it around the aforementioned heads for recording and reproduction, and a tape drive mechanism including capstans, pinch-rollers and so forth for driving the tape along the tape run path defined by the tape guide mechanism. The aforementioned components of the recorder mechanism are mounted on the upper surface of the mechanical chassis. On the other hand, the recorder mechanism also has components provided beneath the mechanical chassis 4. The components of the recorder mechanism provided on the lower surface of the mechanical chassis 4 include a drive mechanism a motor or motors, a power transmission mechanism and a servo-system. The drive mechanism and the power transmission mechanism cooperate to drive the rotary head, the capstan, the reel mounts and so forth.

All of the components of the recorder mechanism 10 are mounted on the mechanical chassis 4 for movement with the latter between the aforementioned eject position, first load position and the second load position with the mechanical chassis, as shown in FIGS. 1 to 6.

A chassis drive mechanism moves the mechanical chassis to one of the eject, first load or second load positions. The chassis drive mechanism will be described in detail with reference to FIGS. 4 to 7 herebelow.

A stationary guide member 15 parallels one side, i.e. the right in the shown embodiment, of the mechanical chassis. The guide member 15 is fixedly attached to the recorder housing 2 by means of one or more support members, such as mounting brackets (not shown). The guide member 15 lies next to the side of the mechanical chassis 4. The guide member 15 is in the form of a thin strip with a first horizontal section, a second vertical section and a third curving section connecting the first and second sections. The guide member encloses a guide slot 16 extending along nearly its entire length. The guide slot 16 has horizontal and vertical sections 16a and 16b and a third section 16c connecting them, as does the guide 15. The third section 16c curves through about 90°. The section 16c will be referred to hereafter as "curve section".

Figure 7:
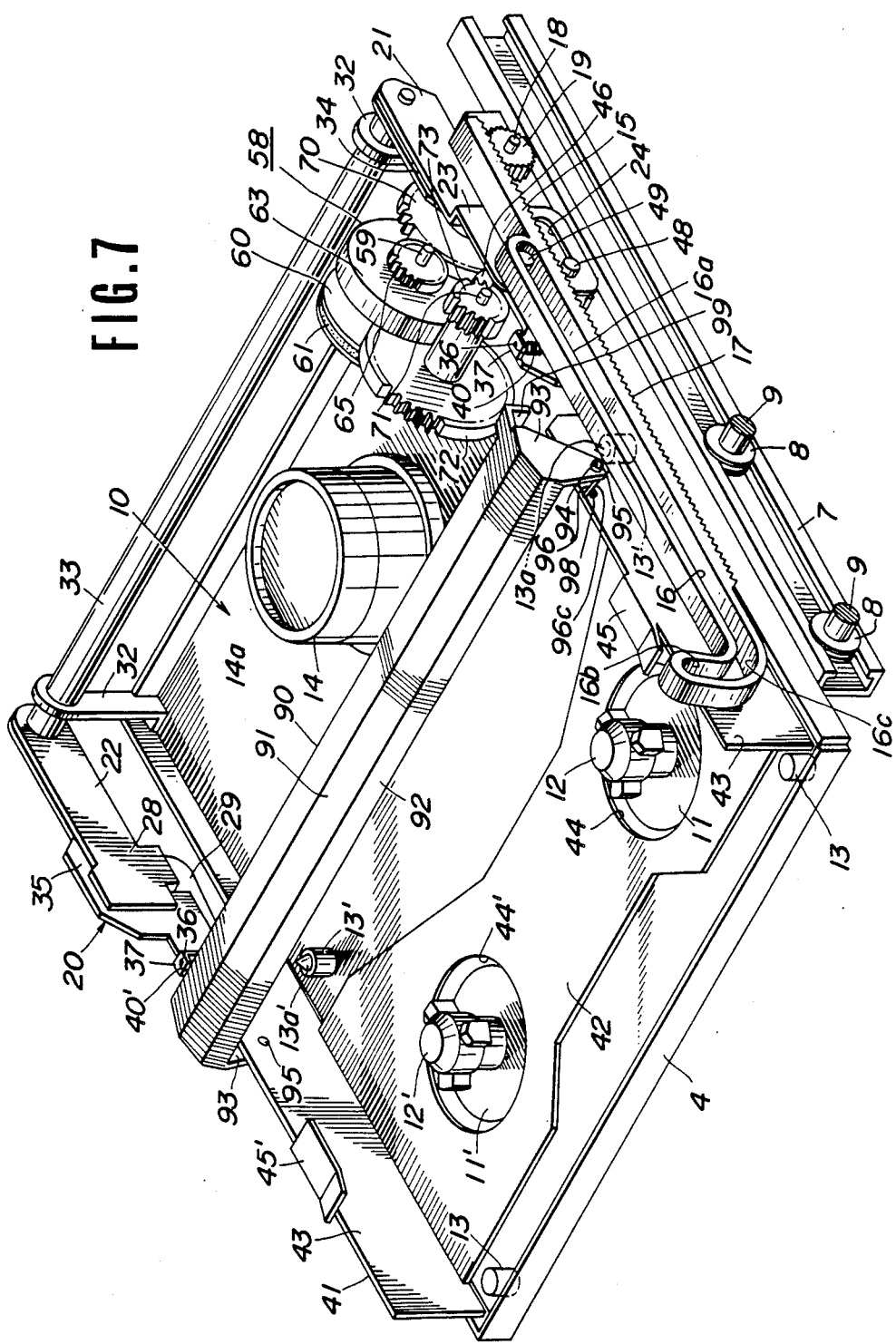
FIG. 7 is a perspective view of the mechanical chassis and a cassette holder.

As shown in FIGS. 4 to 7, the vertical section of the guide member 15 and the guide slot 16 extends upwards from the horizontal section. The guide slot 16 receives a guide pin 49 and so constrains the sliding movement of the latter. The guide member 15 also has a rack 17 extending along its lower edge. As shown in FIG. 7, the rack 17 extends along nearly the entire length of the first horizontal section of the guide member 15. A chassis drive gear 19 engages the rack 17. The chassis drive gear 19 is fixedly mounted on the free end of a rotatable gear shaft 18 which is rotatably supported by the recorder housing 2 through a bearing (not shown). The gear shaft 18 extends outwards from the outer edge of the mechanical chassis 4 and has the chassis drive gear 19 at its outer free end. The chassis drive gear 19 is so arranged so to maintain engagement with the reack throughout the range of travel of the mechanical chassis and serves to drive the latter among the foregoing eject, first load and second load positions. The chassis drive gear 19 is connected to a driving motor 50 through a power transmission mechanism which will be described later. In practice, the driving motor 50 is reversible and so can drive the chassis drive gear 19 in either direction. When the drive gear 19 is driven clockwise, the mechanical chassis 4 moves forward. Conversely, when the gear 19 is driven counterclockwise, the mechanical chassis 4 is driven rearward. Thus, the mechanical chassis 4 can be driven via the gear 19 to the eject position of FIGS. 1 and 4, the first load position of FIGS. 2 and 5 or the second load position of FIGS. 3 and 6. As shown in FIGS. 4 and 5, at the ejecting position and the first load position of the mechanical chassis 4, the chassis drive gear 19 is at the front and rear ends of the rack 17.

Figure 8:
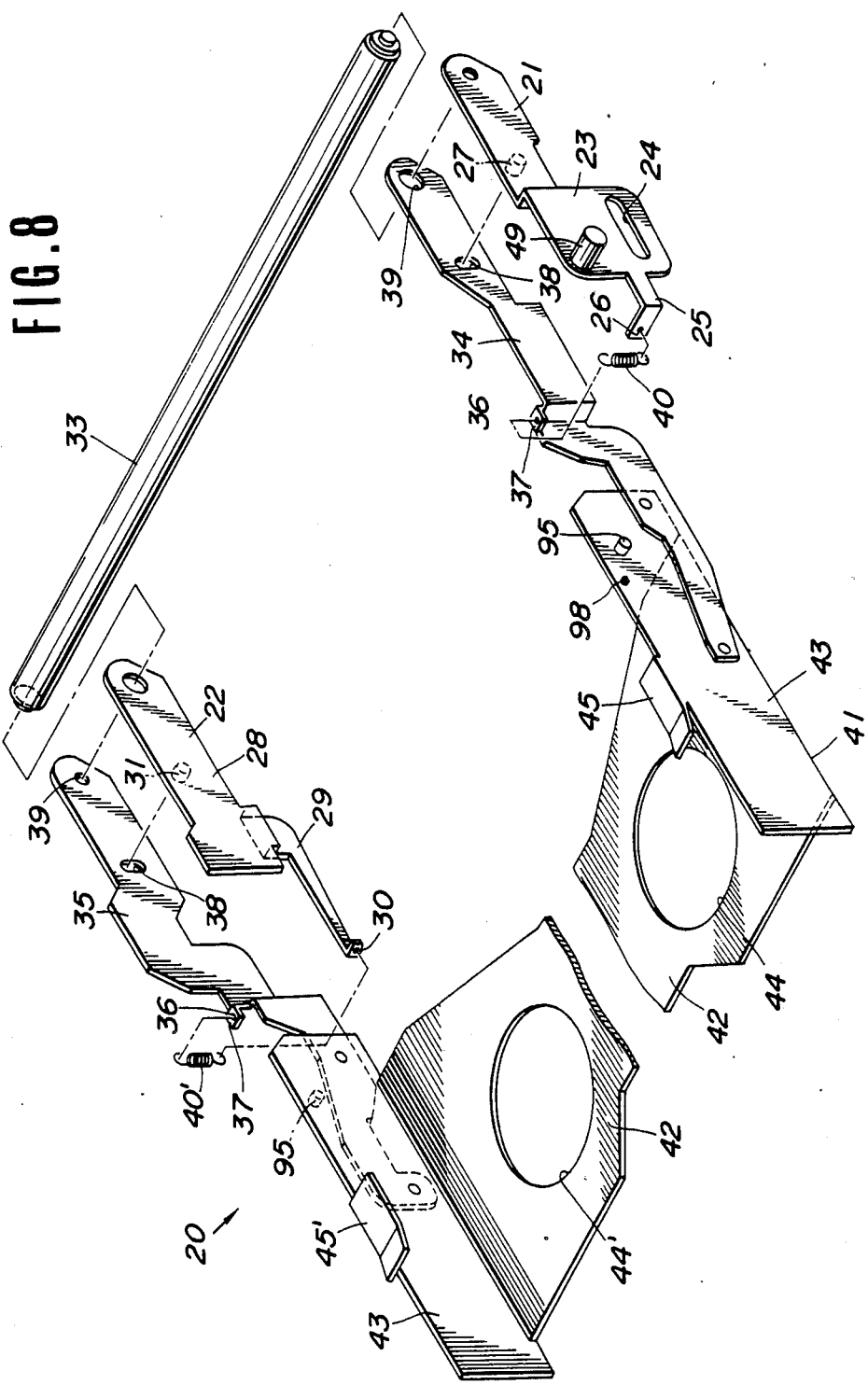
FIG. 8 is an exploded view of the cassette holder.

A cassette eject mechanism 20 is supported by the mechanical chassis 4. The cassette eject mechanism 20 includes a pair of main pivotal arms 21 and 22 extending along the sides of the mechanical chassis 4. As shown in FIG. 8, the pivotal arm 21 has a crank-shaped or dog-legged configuration in plan view with an outward bent section which divides the arm into a front section 23 and a rear section. The front section 23 has a greater vertical height than the rear section. The guide pin 49 projects outwards from the upper front corner of the front section 23 of the pivotal arm 21. An elongated slot 24 is formed near the bottom of the front section 23. An essentially L-shaped strip 25 extends forward from the front vertical edge of the front section 23. The strip 25 has a transversely bent front end which is formed by bending the front end of the strip inward. A hole 26 is formed in the bent front end of the strip 25. The hole 26 anchors the lower end of a coil spring 40. A pin 27 projects inward from the rear section. A circular hole is formed near the rear end of the rear section. The circular hole of the pivotal arm 21 engages one end of a shaft 33.

The other pivotal arm 22 has a major rear section 28 extending along the side of the mechanical chassis 4. A horizontally and transversely bent section projects from the lower edge of the front end of the rear section 28. The horizontally and transversely bent section connects a front section 29 to the rear section 28. As apparent from FIG. 8, the vertical height of the front section 29 tapers towards the front. The front end of the front section 29 is turned inwards at an acute angle. A hole 30 through the bend front end anchors the lower end of a coil spring 40'.

A pin 31 extends outwards from the rear section 28. A circular hole is also formed in the rear end of the rear section 28. The circular hole of the pivotal arm 22 engages the other end of the shaft 33.

As shown in FIG. 7, the shaft 33 is rotatably supported on the mechanical chassis 4 by means of support brackets 32. The support brackets 32 extend upwards from the mechanical chassis 4 near the rear corners of the chassis. Since the pivotal arms 21 and 22 are fixedly secured to opposite ends of the shaft 33 which is free to rotate within the support bracket 32, the arms 21 and 22 pivot together about the rotational axis of the shaft 33.

A pair of auxiliary arms 34 and 35 are rotatably mounted on the shaft 33 through circular openings 39. As will be appreciated from FIG. 7, the auxiliary arm 34 lies parallel to and just inside the pivotal arm 21. Conversely, the auxiliary arm 35 is located outside the pivotal arm 22.

The auxiliary arm 34 is essentially crank-shaped as seen in elevation, having an intermediate section bent outwards between front and rear sections. A horizontal tab 37 extends from the upper edge of the intermediate section. The tab 37 has a hole 36 which anchors the upper end of the coil spring 40. The auxiliary arm 34 also has a vertically elongated opening 38. The pin 27 projecting from the rear section of the pivotal arm 21 slidingly engages the vertically extending opening 38.

The coil spring 40 is a tension spring biasing the strip 25 of the pivotal arm 21 and the tab 37 of the auxiliary arm 34 toward each other. As a result, the arms 21 and 34 are constantly urged to stay together. Pin-and-hole engagement between the pin 27 and the elongated opening 38 helps hold the arms 21 and 34 in a predetermined positional relationship.

The auxiliary arm 35 has essentially the same configuration as the first auxiliary arm, including a horizontal tab 37 extending from the upper edge of the intermediate section. The tab 37 has a hole which anchors the upper end of the spring 40'. The spring 40' is a tension spring biasing the tab 37 and the inward bent front end of the pivotal arm 22 toward each other. The auxiliary arm 35 also has a vertically elongated opening 38 engaging the pin 28 projecting from the rear section of the pivotal arm 22. The spring force provided by the tension coil spring 40' and the engagement between the pin 28 and the elongated opening 38 hold the pivotal arm 22 and the auxiliary arm 35 in a predetermined positional relationship.

A cassette holder 41 is fixed to the front sections of the auxiliary arms 34 and 35. The cassette holder 41 has a horizontal floor plate 42 and a pair of side walls 43 extending upwards from the edges of the floor plate. The side walls 43 are fixedly secured to the corresponding auxiliary arms 34 and 35.

The floor plate 42 has a central narrower section between side sections in which circular openings 44 and 44' are formed. The openings 44 and 44' essentially coincide with the position of reel hub of the video tape cassette when inserted in the cassette holder 41. The positions of the circular openings 44 and 44' naturally also coincide with the positions of the reel mounts 11 and 11' so as to allow the latter to engage the reel hubs of the video tape cassette in the load position. Cassette retainer tabs 45 and 45' project transversely and horizontally from the upper edges of the side walls 43. The front sections of the cassette retainer tabs 45 and 45' are tilted upwards so as to open forwards. These tilted front sections of the tabs 45 and 45' allow easy and convenient insertion of the video tape cassette into the cassette holder 41.

Figure 9:
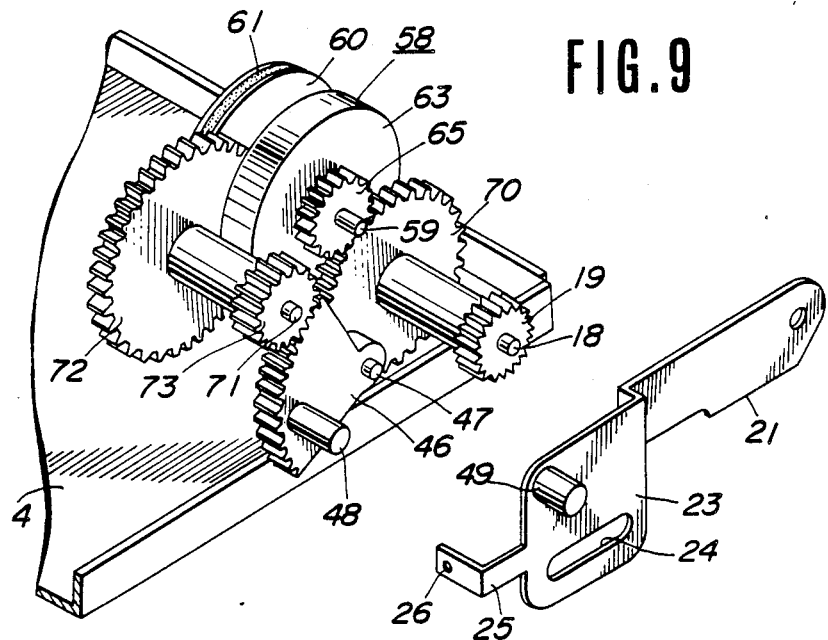
FIG. 9 is an enlarged perspective view of part of the driving mechanism for the mechanical chassis and the cassette holder.
Figure 10:
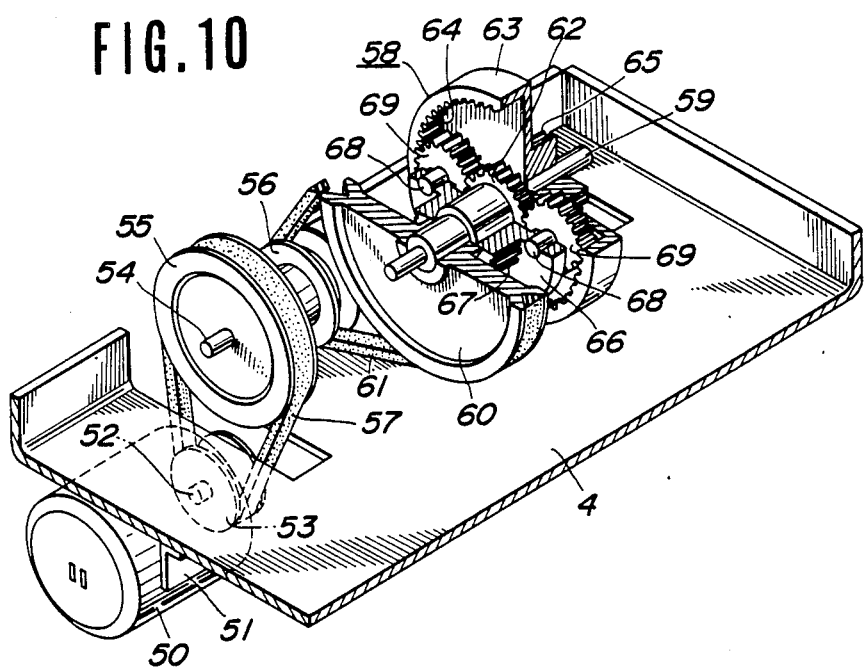
FIG. 10 is an enlarged perspective view of part of the video tape recorder of FIG. 1 specifically of the driving power transmission mechanism for the driving mechanism of FIG. 9.

FIGS. 9 and 10 show the drive mechanism and the power transmission mechanism for driving the drive gear 19 and thereby driving the mechanical chassis 4 frontwards and rearwards by means of the motor 50.

A sector gear 46 is rotatably supported by a gear shaft 47 for pivotal motion about a rotation axis coincident with the gear shaft. The gear shaft 47 is journalled on the mechanical chassis 4 in a per se well known manner. The sector gear 46 opposes the front section 23 of the pivotal arm 21. Near its geared outer periphery, the sector gear 46 has an actuation pin 48 projecting outwards. The actuation pin 48 engages the longitudinally elongated slot 24 of the front section 23 of the pivotal arm 21.

The sector gear 46 is driven by the motor 50 for pivotal movement about the gear shaft 47. According to the pivotal movement of the sector gear, the pivotal arm 21 is pivotally driven via the actuation pin 48 about the rotation axis of the shaft 33. Rotational force caused by pivotal movement of the pivotal arm 21 is transmitted to the pivotal arm 22 through the shaft 33 to cause pivotal movement of the pivotal arm 22.

It should be appreciated that the sector gear 46 is normally in the position illustrated in FIG. 9 in which the pivotal arm 21 is essentially horizontal. The sector gear 46 is driven to actuate the pivotal arm 21 to the upward shifted position when the mechanical chassis 4 is in the eject position of FIGS. 1 and 4.

As the pivotal arms 21 and 22 pivot upwards, the auxiliary arms 34 and 35 coupled to the pivotal arms 21 and 22 via the springs 40 and 40' and the pins 27 and 28, pivot upwards with the cassette holder 41. This upward shifted position of the cassette holder 41 will be referred to hereafter as the "eject position" of the cassette holder. Conversely, while the pivotal arms 21 and 22 are in their normal horizontal position, the floor plate 42 of the cassette holder 41 remains essentially parallel to the upper surface of the mechanical chassis 4. In this position, the reel mounts 11 and 11' of the mechanical chassis 4 extend through the circular opening 44 and 44' of the floor plate 42 of the cassette holder 41. This position of the cassette holder 41 will be referred to hereafter as "set position". As will be seen from FIGS. 1 to 6, in the eject position of the mechanical chassis 4, the cassette holder 41 is also in its eject position. Conversely, when the mechanical chassis 4 is in either the first load position or the second load position, the cassette holder 41 remains in the set position.

As will be appreciated, the cassette holder 41 can be shifted to its eject position only when the mechanical chassis 4 is shifted out of the recorder housing to the eject position. The coordination between the upward movement of the cassette holder 41 and the outward movement of the mechanical chassis 4 is controlled by the engagement between the guide pin 49 and the guide slot 16 of the guide member 15. This coordination will be described in detail hereinafter. In addition, the guide pin 49 controls the operation of the mechanical chassis drive mechanism.

The motor 50 is mounted on the lower surface of the mechanical chassis 4 by means of a mounting bracket 51. The motor 50 is located near the rear edge of the mechanical chassis 4. As the motor 50 is fixedly mounted on the mechanical chassis 4 by means of the mounting bracket 51, it moves forward and backward with the mechanical chassis. The motor 51 has a motor shaft 52 with a drive pulley 53. The drive pulley 53 is connected to a larger diameter pulley 55 in the power transmission mechanism via a belt 57. The pulley 55 is secured to a pulley shaft 54 supported by the mechanical chassis 4 by means of a bearing (not shown) for rotation about its rotational axis.

A smaller diameter pulley 56 is also fixedly mounted on the pulley shaft 54 with some clearance from the pulley 55. The pulley 56 is connected to a pulley 60 through an endless belt 61. The pulley 60 is secured to a rotary shaft 59. A sun gear 62 is fixed to the rotary shaft 59 with some clearance from the pulley 60. The sun gear 62 constitutes part of an idler gear mechanism 58.

The idler gear mechanism 58 includes a ring gear member 63 as a first rotary member. The ring gear member 63 is an internal cylindrical gear ring having gear teeth 64 on the internal periphery thereof. A pair of idler gears 69 connect the sun gear 62 to the internal teeth 64 of the ring gear member 63.

A disc rotor 66 serving as a second rotary member is disposed between the ring gear member 63 of the idler gear mechanism 58 and the pulley 60. The disc rotor 66 is integrally formed with a gear 67 adjoining the pulley 60. This gear section 67 of the disc rotor 66 will be referred to hereafter as "second output gear". The disc rotor 66 is rotatably supported by the rotary shaft 59 for rotation about the shaft 59. The disc rotor 66 is formed with a pair of diametrically opposed bearing holes extending therethrough. The bearing holes of the disc rotor 66 receive a pair of gear shafts 68 rotatably supporting the idler gears 69. With this arrangement, the disc rotor 66 is driven by movement of the idler gears 69 along the internal teeth 64 of the ring gear 63 while the idler gears are driven by the motor 50 via the pulleys 53, 55, 56 and 60. The diametrical dimensions of the pulleys 53, 55, 56 and 60 determine the revolution speed of the gear section 67 of the disc rotor 66. This idler gear movement occurs while the ring gear member 63 is locked to prevent rotation thereof. Conversely, when the ring gear member is free to rotate and the disc rotor 66 is prevented from rotating, then the ring gear member 63 is driven by the motor power transmitted through the pulleys 53, 55, 56 and 60 and the endless belts 57 and 61, and the sun and idler gears 62 and 69.

The ring gear member 63 is fixed to the rotary shaft 59 by means of an integral wall. A gear section 65 serving as a first output gear is integrally formed with the wall section of the ring gear member. The first output gear 65 is on the opposite side of the wall section of the ring gear member 63 from the teeth 64. The first output gear 65 engages a reduction gear 70. The reduction gear 70 is fixedly mounted on the end of the gear shaft 18, opposite to the end on which the drive gear 19 is mounted. Therefore, the driving force for moving the mechanical chassis 4 forward and backward is provided by the motor 50 through the pulleys 53, 55, 56, 60, the idler gear mechanism 58 and the reduction gear 70 to the drive gear 19.

The second output gear 67 meshes with a reduction gear 72 fixedly mounted on one end of a rotary shaft 71 which is rotatably supported by the mechanical chassis 4 by means of a bearing bracket or the like (not shown). The rotary shaft 71 mounts, at its other end, a drive gear 73 for driving the sector gear 46. Therefore, the sector gear 46 is driven by the motor 50 through the pulleys 53, 55, 56 and 60, the idler gear mechanism 58, the second output gear 67, the reduction gear 72 and the drive gear 73 which meshes with the gear teeth on the edge of the sector gear 46.

As set forth above, according to the shown embodiment, the translation of the mechanical chassis 4 between the eject position, the second load position and the first load position, and the rotation of the cassette holder 41 can be achieved by a single motor, i.e. motor 50. For instance, when the ring gear member is driven by the driving force of the motor transmitted through the sun gear 62 and the idler gears 69, the drive gear 19 is active to drive the mechanical chassis 4 frontwards and backwards along the guide rail 7. On the other hand, when the disc rotor 66 is driven by the driving force of the motor 50 transmitted through the sun gear 62, the idler gears 69 moving along the internal periphery of the ring gear member 63 cause pivotal movement of the sector gear 46. Pivotal movement of the sector gear 46 drives the pivotal arms 21 and 22, and the auxiliary arms 34 and 35 with the cassette holder between the cassette holder eject position and the set position.

As set out above, switching of the power train through which the driving force of the motor 50 is selectively transmitted to the drive gear 19 or the sector gear 46 is performed by the guide pin slidingly engaging the guide slot 16 of the guide member 15, and the idler gear mechanism 58. The switching process of the power train will be explained in greater detail hereinafter.

When the guide pin 49 is located in the horizontal section 16a of the guide slot 16, as shown in FIGS. 2 and 3, vertical movement of the pivotal arm 21 is restricted. Therefore, the sector gear 46 is locked in its initial position shown in FIG. 9. As a result, the disc rotor 66 is held in its locked position and thus prevented from rotating. In this case, since the driving gear 19 can rotate to drive the mechanical chassis frontward and backward, the ring gear member 63 is free to rotate. Therefore, if the motor 50 is energized, the driving force of the motor is transmitted through the pulleys 53, 55, 56 and 60, the sun gear 62, the idler gears 69, the ring member 63, the first output gear 65, the reduction gear 70, to the drive gear 19. The drive gear 19 rotates according to the driving direction of the motor to move forward and backward along the guide path defined by the guide rail 7 and the guide rollers 8 and 8'.

At the frontward extreme of travel of the mechanical chassis 4, the guide pin 49 reaches the lower end of the vertical section 16b of the guide slot 16 of the guide member 15. The engagement of the guide pin 49 and the inner periphery of the vertical section 16b of the slot 16 prevents the mechanical chassis 4 and the drive gear 19 from moving further frontward. In addition, as long as the guide pin 49 is in the vertical section 16b, backward movement of the mechanical chassis 4 and the drive gear 19 is prevented. Therefore, the drive gear 19 is prevented from rotation. This locks the ring gear member 63 to prevent the latter from rotating. In this case, since the guide pin 49 is in the vertical section 16a, the pivotal arm 21 can pivot about the rotational axis of the rotary shaft 33. Therefore, the sector gear 46 becomes free to pivot. The disc rotor 66 can thus be rotated about its rotational axis by the driving force of the motor transmitted through the idler gear mechanism.

In this case, the driving force of the motor 50 is transmitted through the pulleys 53, 55, 56 and 60, the sun gear 62, the idler gears 69, the disc rotor 66, the second output gear 67, the reduction gear 72 and the drive gear 73, to the sector gear 46. As a result, the sector gear 46 is driven in the same direction as the motor 50. According to pivotal movement of the sector gear 46 driven via the drive gear 73, the pivotal arm 21 pivots together with the pivotal arm 22 about the rotation axis of the rotary shaft 33. Pivotal movement of the pivotal arms 21 and 22 drives the auxiliary arms 34 and 35 and the cassette holder 41 between the eject position and the set position.

When the guide pin 49 is in the curved section 16c, both translation and rotation are possible. Therefore, in this case, both power trains transmit the driving force of the motor 50. In order to simultaneously move both the mechanical chassis 4 and the cassette holder, the driving direction of the drive gears 19 and 73 are determined so that:

when the drive gear 19 is driven to drive the mechanical chassis 4 frontward, the drive gear 73 drives the sector gear 46 clockwise;

when the drive gear 19 drives the mechanical chassis 4 backward, the drive gear 73 drives the sector gear counterclockwise to shift the cassette holder 41 downward to its initial position.

It should be appreciated that, in the above case, the distribution of driving force between the drive gears 19 and 73 gradually changes between pure modes of movement. For instance, when the motor is turning in the direction driving the mechanical chassis 4 frontward, the angular velocity of the drive gear 19 gradually drops as the guide pin 49 moves forward along the curved section 16c and finally drops to zero when the guide pin 49 reaches the lower end of the vertical section 16b. At the same time, the angular velocity of the drive gear 73 gradually increases to its maximum when the guide pin 49 reaches the lower end of the vertical section 16b. Conversely, when the motor is driven in the opposite direction, the speed of the drive gear 19 gradually increases to its maximum as the guide pin 49 approaches the front end of the horizontal section 16a. Over this same period, the speed of the drive gear 73 gradually drops to zero as the guide pin 49 reaches the front end of the horizontal section 16a.

In the shown embodiment, the curved section 16c is arranged so that the vertical displacement of the cassette holder 41 will take place while the cassette holder 41 remains outside of the recorder housing 2. The point at which the vertical displacement of the cassette holder 41 starts also depends on the position which has been referred to as the second load position shown in FIGS. 3 and 6. In this second load position, the cassette holder must be in its set position to allow the video tape to be recorded and/or played back.

As set forth above, according to the shown embodiment, the mechanical chassis 4 and the cassette holder 41 are operated by means of the common motor 50 with mechanical automatic position control.

A video tape cassette 74 applicable to the preferred embodiment of the video tape recorder according to the present invention will be described herebelow with reference to FIGS. 12, 13 and 19. The video tape cassette 74 has a cassette casing 75 in a thin box-shaped configuration. The cassette casing 75 has a front open end across which a video tape 78 runs through openings 76 formed near its opposite ends. Front ends of the upper and lower horizontal walls are formed wit cutouts 77 which allow an element of the tape loading mechanism to be inserted into the space behind the tape 78 in order to load the tape onto the heads.

Figure 18:
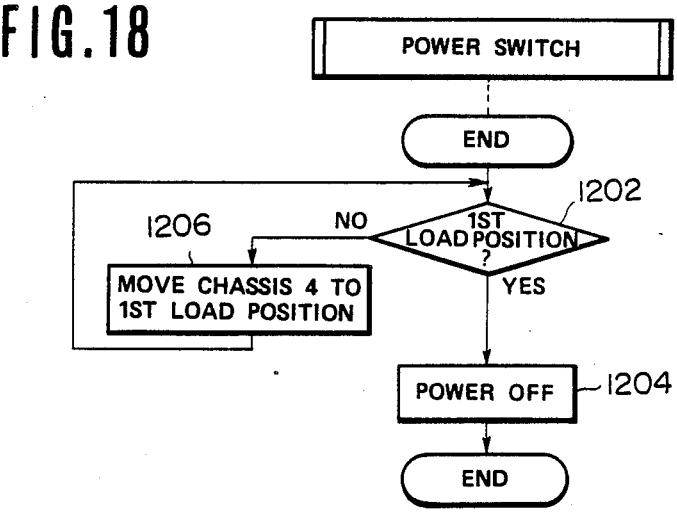
FIG. 18 is a flowchart of another interrupt program executed when power is turned off.

As is well known, a pair of tape reels 79 are disposed within the cassette casing 75. The video tape 78 is wound around the tape reels 79. In FIG. 18, only the supply or driven reel has been shown. Although not clearly illustrated, the tape reel 79 is associated with a reel hub engageable to the reel hub shafts 12 and 12' of the reel mount 11 and 11' of the recorder mechanism 10. For instance, when the video tape cassette 74 is inserted into the cassette holder 41 and the cassette holder 41 is retracted to its set position, the reel hubs associated with the tape reels 79 engage the reel hub shafts 12 and 12' to be driven thereby. The video tape 78 then runs through the openings 76 and across the front end opening in front of the tape loading space defined by the cut-outs 77 of the upper and lower walls of the cassette casing.

As shown in FIG. 19, a retainer spring 80 is disposed within the cassette casing 75. The spring 80 resiliently restricts movement of the tape reel 79 relative to the cassette casing. In the stand-by state, the spring 80 biases the tape reel against the upper surface of the floor of the cassette casing and in the loaded state, the spring biases the tape reel against the reel mounts 11 and 11' to assure driving engagement between the reel hub and the reel hub shafts 12 and 12'.

A transparent window 81 is formed in the ceiling of the cassettte casing 75 opposite the supply reeel 79. This transparent window 81 displays how much tape remains on the supply reel 79. The remainder of the upper surface area of the casing 75 can be labelled (82) for identification.

The cassette casing 75 is provided with a front opening lid 83 which covers the front opening of the cassette casing while the tape cassette is not in use. The lid 83 generally comprises a major section covering the front end opening of the cassette casing 75, and a pair of side wall sections 85 extending perpendicularly to opposite ends of the major section. The lid 83 is pivoted at the side wall sections 85 for pivotal movement between an open position in which the major section is pivoted away from the front end opening of the cassette casing to expose the tape 78, and a closed position in which the major section covers the front end opening of the casing parallel to the upper wall of the casing.

It should be appreciated that, in the drawings, the reference numeral 84 denotes the front end space including the tape path, tape loading space and so forth in the front end of the cassette casing.

The lid 83 is pivotally mounted on the front end portion of the cassette casing 75 by means of projections 86 projecting inward from side wall sections 85. The projections 86 are engage holes formed in the side walls of the cassette casing 75. The projections 86 serve as pivot axles for the lid for movement between the closed position and open position described above.

One of the projections 86 has a pin 87 projecting therefrom. That projection 86 protrudes inside the cassette casing 75 through the side wall. The pin 87 projecting from the projection 86 is thus inside the casing 75. A torsion spring 88 is wound around this projection 86. One end of the torsion spring 88 engages the pin 87. The torsion spring 88 has a coil section 88a wound around the projection 86, a leg 88b extending from the coil and seated against the ceiling of the cassette casing 75, and a second leg 88c with an annular ring engaging the pin 87. The torsion spring 88 applies a resilient force biasing the lid 83 toward the cassette casing 75. Specifically, the torsion spring normally applies clockwise resilient force on the lid 83 to hold the lid 83 in the closed position.

The lid 83 is formed with a pair of cut-outs 89 in the lower edge of the major section near either edge. The cut-outs 89 are designed to engage a projecting section of the floor of the cassette casing 75 in the closed position of the lid 83.

Figure 11:
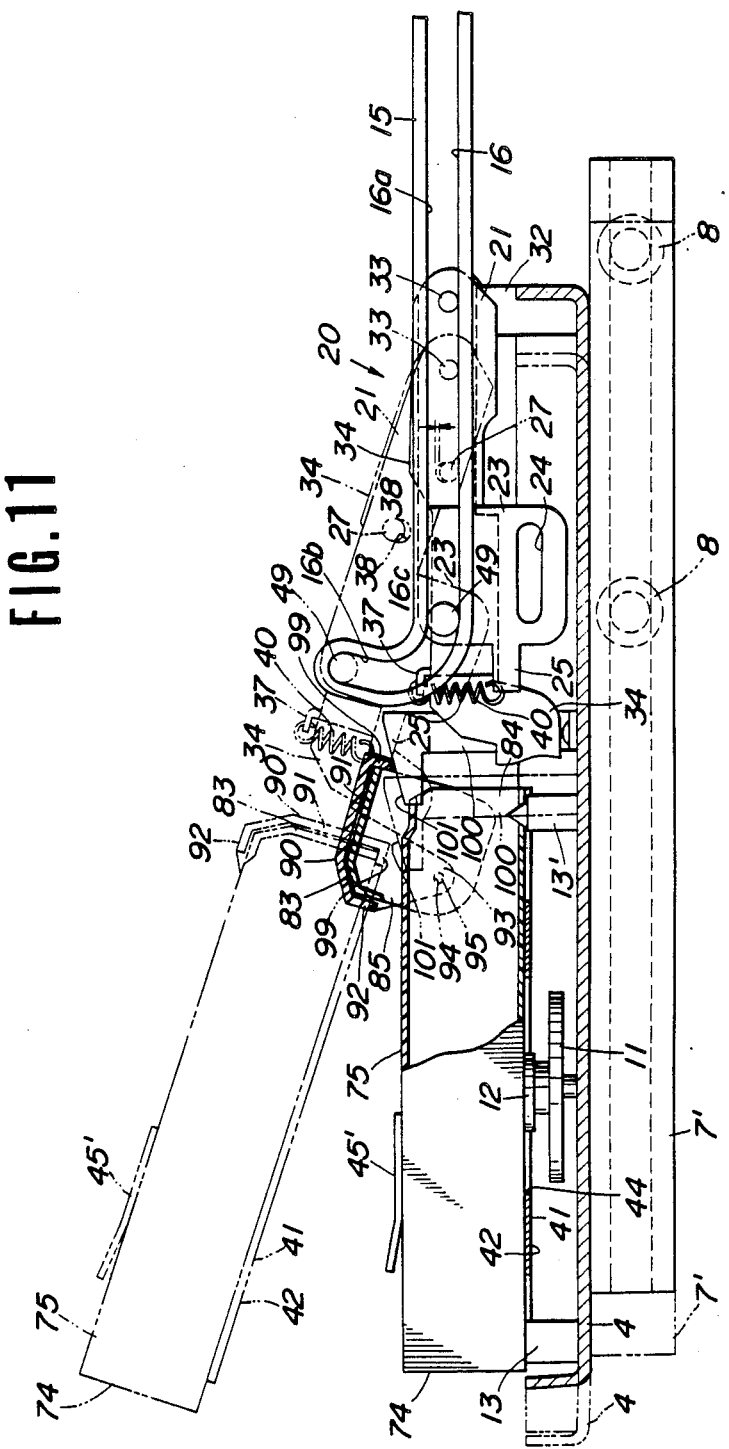
FIG. 11 is a side elevation of part of the video tape recorder of FIG. 1, illustrating the removal of a closure lid of the tape cassette.
Figure 12:
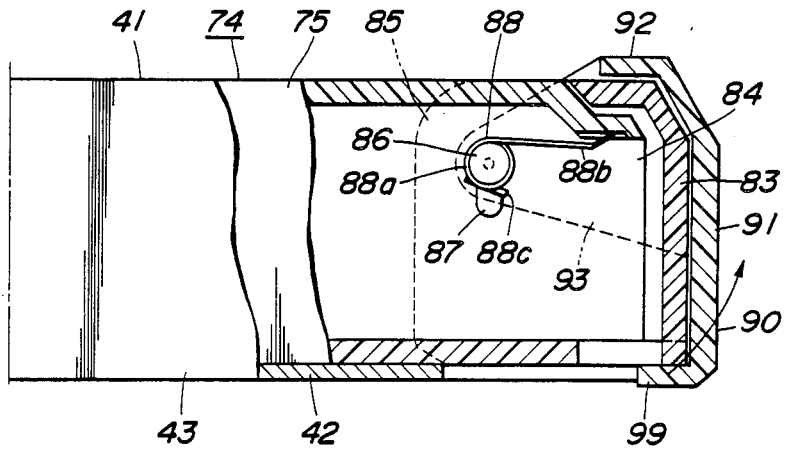
FIG. 12 is an enlarged cut-away view of the video tape cassette mounted on the cassette holder.
Figure 13:
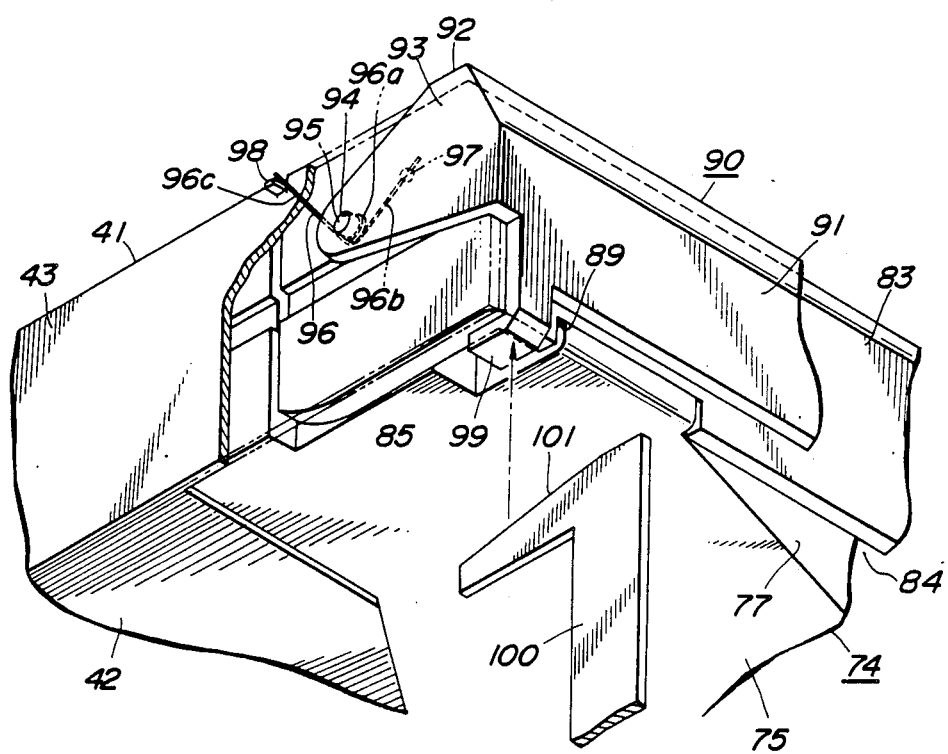
FIG. 13 is partially cut-away perspective view of the video tape cassette mounted on the cassette holder.

FIGS. 12 and 13 shows the closure lid 83 in solid line. In FIGS. 11 and 19, the lid 83 is shown in the closed position in phantom lines. On the other hand, in FIGS. 11 and 19, the lid 83 is illustrated in the open position in solid line. The lid 83 cooperates with a lid opener mechanism in the recorder mechanism 10, which lid opener mechanism will be described later.

The insertion and ejection of the cassette in the preferred embodiment of the video tape recorder of the invention will be described in detail with reference to FIG. 11.

In order to set the video tape cassette 74 in the video tape recorder, it is essential to first move the mechanical chassis 4 and the cassette holder 41 to their respective eject positions. In order to move the mechanical chassis 4 and the cassette holder 41 to the eject positions, the motor 50 may be driven in a normal direction. This moves the mechanical chassis 4 frontward outside of the recorder casing 2. As the mechanical chassis 4 moves, the pivotal arms 21 is driven by the sector gear 46 to pivot the pivotal arm 22, the auxiliary arms 34 and 35 and the cassette holder 41 upward to the position illustrated in phantom line in FIG. 11.

In this position, the tape cassette 74 can be inserted into the cassette holder 41. Preferably, the cassette holder 41 is provided with positioning means for positioning the video tape cassette 74 within the cassette holder 41. After the video tape cassette 74 is inserted into the cassette holder 41, the opening formed in the floor of the cassette casing 75 is aligned with the openings 44 and 44' formed in the bottom plate 42 of the cassette holder 41. The retainer tabs 45 are in contact with the upper surface of the video tape cassette 74 to restrict movement of the cassette 74 within the cassette holder 41.

After putting the video tape cassette 74 into the cassette holder 41 at the eject position of the latter, one of the push buttons in the array on the front panel is depressed. In response to depression of the push button, the motor 50 is driven in the reverse direction. As a result, the cassette holder 41 is lowered to the set position as the guide pin 49 follows the vertical section 16b of the guide slot 16. After the guide pin 49 reaches the front or upper end of the curved section 16c, the mechanical chassis 4 starts to translate backward. Continued operation of the motor 50 drives the mechanical chassis 4 on which the cassette holder 41 rests in its set position to the selected first or second load position.

Just before the lower extreme of travel of the cassette holder 41, the cassette holder 41 abuts the positioning pins 13 and 13'. The positioning pins 13 and 13' respectively engage corresponding positioning holes formed in the video tape cassette 74 to accurately position the cassette 74 relative to the recorder mechanism 10 on the mechanical chassis. In this case, the front side positioning pin 13 contacts the lower surface of the video tape cassette 74. On the other hand, the conical tops 13a' of the rear side positioning pin 13' engage the engaging holes in the cassette 74 at until the lower surface of the cassette 74 rests atop the rest of the pins 13'. As a result, the video tape cassette 74 is accurately vertically, longitudinally and transversely positioned relative to the recorder mechanism 10.

Contact between the lower surface of the cassette 74 and the tops of the positioning pins 13 and 13' prevents further downward movement of the cassette holder 41 and the auxiliary arms 34 and 35. Therefore, thereafter, only the pivotal arms 21 and 22 can pivot further downward to their initial positions according to the pivotal movement of the sector gear 46 until the guide pin 49 reaches the front end of the horizontal section 16a of the guide slot. The set position of the cassette 74 and relative positions of the cassette holder 41 and the pivotal arm 21 are shown in solid line in FIG. 11. This further downward movement of the pivotal arms 21 and 22 is allowed by the vertical freedom of the pin 27 and 28 along the vertically elongated holes 38 of the auxiliary arms 34 and 35. In FIG. 11, the distance L represents the freedom of relative movement between the pivotal arm and the corresponding auxiliary arm.

As the relative displacement between the pivotal arms 21 and 22 and the auxiliary arms 34 and 35 increases, the spring force of the compression springs 40 and 40' increases. This spring force is exerted downward on the video tape cassette 74 in the cassette holder 41 through the auxiliary arms 34 and 35 and the cassette holder 41. This downward force urges the video tape cassette 74 toward the recorder mechanism 10. This helps hold the cassette 74 stable in the recorder mechanism 10.

As the cassette holder 41 settles into the set position, the mechanical chassis 4 continues to shift to the second load position illustrated in solid line in FIG. 11.

Conversely, when the video tape cassette 74 is to be ejected, an eject button in the array on the front panel 3 is depressed. In response to depression of the eject button, the motor 50 is driven in the normal direction whereby the drive gear 19 drives the mechanical chassis 4 frontward toward its eject position. As the mechanical chassis 4 moves frontward, the sector gear 46 is driven via the drive gear 73 after the guide pin 49 reaches the curved position 16c. Therefore, when the guide pin 49 enters to the curved section 16c, the driving force of the motor 50 is applied to the drive gear 73 to drive the sector gear 46. As a result, the sector gear 46 pivotally moves, causing corresponding pivotal movement of the pivotal arms 21 and 22. According to the pivotal movement of the pivotal arms 21 and 22, the auxiliary arms 34 and 35 and the cassette holder 41 move toward the eject position. The pivotal movement of the auxiliary arms 34 and 35 and the cassette holder 41 is delayed for a short period during which the pins 27 and 28 move upward along the vertically elongated holes 38 to the upper ends of the elongated holes. After the pins 27 and 28 abut the upper edge of the holes 38, the driving force on the pivotal arms 21 and 22 is exerted directly on the auxiliary arms 34 and 35.

The pivotal movement of the sector gear 46 by the motor 50 moves the auxiliary arms 34 and 35 and the cassette holder 41 upward to the eject position, at which the guide pin 49 reaches the upper end of the vertical section 16b of the guide slot 16. In this eject position, the cassette can be removed from the cassette holder.

The mechanical chassis 4 also has a lid opener for opening the lid 83 of the video tape cassette 74. The structure and operation of the lid opener will be described hereafter with reference to FIGS. 7 and 11 to 13.

A lid opening member 90 extends transversely over the cassette holder 41. The lid opening member 90 has a pair of pivoting arms 93 extending perpendicularly from both ends of the major section 91. The pivoting pieces 93 are pivotally mounted on opposite side walls 43 of the cassette holder 41 near the rear edge of the cassette. The lid opening member 90 is thus pivotable about the pivot axis of the pivoting pieces 93 between a first position in which the major section 91 lies vertical and mates with the rear end of the cassette holder 41 as shown in FIGS. 12 and 13, and a second position in which the major section 91 lies horizontal over the cassette holder 41 as shown in FIG. 7.

The major section 91 is formed of a thin strip of flat material, the width of which matches the height of the side walls 43 of the cassette holder 41.

In the foregoing first position, the upper edge 92 of the major section 91 lies flush with the upper edge of the side walls 43 of the cassette holder 41. As shown in FIGS. 12 and 13, the upper portion of the major section 91 tapers frontward toward upper edge 92. The upper edge 92 is extends slightly frontward.

The pivoting arms 93 are formed with through holes 94 near their free ends. The holes 94 pivotally engage with pivot pins 95 extending from the outer surface of the side walls 43 of the cassette holder 41. The pivoting arms 93 also cooperate with resilient bias means which comprises a torsion spring 96. The torsion spring 96 has a ring section wound around the pivot pin 95. The torsion spring 96 has one end 96b seated on a projection 97 projecting from the inner surface of the pivoting arms 93 of the lid opening member 90. The other end 96c of the torsion spring 96 is seated on a projecting tab 98 of the side wall 43 of the cassette holder 41. The torsion spring 96 biases the lid opening member 90 clockwise as viewed in the drawings toward the foregoing first position.

A pair of hooking arms 99 are provided at opposite ends of the major section 91. The hooking arms 99 extend longitudinally from the lower edge of the major section 91 toward the front. The longitudinal length of the hooking arms 99 is selected so that they can engage the lower edge of the lid 83 of the video tape cassette 74 or at least with the lower edge of the side wall section 85 after the cassette is fully inserted into the cassette holder 41.

The pivot pin 95 projecting from the side wall 43 of the cassette holder 41 is positioned so that the its axis is aligned with the pivotal axis of the projection 86 of the lid 83, as shown in FIG. 12, when the cassette 74 is in the predetermined position relative to the cassette holder 41.

In this arrangement, the hooking arms 99 engage the lower edges of the lid 83 and/or the side wall section 85 of the lid, while the lid opening member 90 pivotally moves from the first position to the second position, as illustrated by the arrow in FIG. 12. Thus, the lid 83 is pivoted to its open position together with the lid opening member 90, when the lid opening member 90 is actuated to open the lid.

The lid opener system also includes an actuator lever 100 mounted on the mechanical chassis 4, as shown in FIGS. 11 and 13. This actuator lever 100 is designed to actuate the lid opening member 90 from the first position to the second position in order to open the lid. The actuator lever 100 is generally L-shaped with a longitudinal upper section 101. The upper edge of the upper section 101 is canted donward toward the front. The actuator level 100 is positioned on the mechanical chassis 4 so as to come into contact with the lower face of the hooking piece 99 of the lid opening member 99 as the cassette holder 41 into which the cassette 74 is inserted moves from the ejecting position to the set position.

The actuator lever 100 per se is a stationary member and does not move vertically to open the lid. However, as the cassette holder 41 moves vertically from the ejecting position to the set position relative to the mechanical chassis 4, it pushes the hooking piece 99 of the lid opening member 90 upward due to its displacement relative to the cassette holder. As a result, the lid 83 can be automatically opened as the cassette holder 41 moves from the eject position to the set position.

During the foregoing lid opening operation, the force of the torsion spring 88 gradually increases. At the open position of the lid 83, the force of the torsion spring 88 exerted on the cassette casing 75 biases the latter outward relative to the mechanical chassis 4. On the other hand, since the lip opening member 90 has pivot points essentially coaxial with the pivot axis of the lid 83, and which pivot points are offset slightly above the vertical center of the side walls 43, the force exerted on the lid opening member 90 contains a component biasing the lip opening member and the lid 83 of the cassette 74 inward. This inward biasing component in the lid opening force counteracts the outward biasing force exerted on the cassette in order to hold the cassette securely in place.

In this position, the front end of the video tape cassette 74 is opened to allow the tape loading member access to the space defined by the cut-outs 77 of the cassette casing 75 in order to load the tape onto the heads through the tape run path defined by the tape guide members.

The preferred arrangement of the push button array provided on the front panel 3 will be described herebelow with reference to FIGS. 1 to 3. The push buttons contained in the array allow well known video tape recorder operations, including recording, play-back, fast-forward tape feed, rewinding, volume control for audio recording/reproducing and so forth.

The array includes mode selector buttons 102a, 102b, 102c, 102d and 102e. These mode selector buttons are to be depressed when a corresponding operational mode of the video tape recorder is to be selected. The mode selector buttons in the preferred embodiment of the video tape recorder according to the present invention are also used to shift the mechanical chassis 4 from the eject position to the first and second load positions. That is, when the mechanical chassis 4 is in the eject position, the motor 50 is triggered to start driving the mechanical chassis 4 from the eject position to one of the first and second load positions.

The mode selector button 102a is a reproduction mode selector button for triggering a reproduction mode in a system controller which will be described later. The mode selector button 102b is a rewinding mode selector, the mode selector button 102c is a fast-forward feed mode selector button, the mode selector button 102d is a record mode selector, 102e is a stop button, and the mode selector button 102f is a pause mode selector. The reproduction mode selector 102a, the rewind mode selector 102b, the fast-forward feed mode selector 102c and the record mode selector 102d can also be used to trigger the system controller to actuate the motor 50 to shift the mechanical chassis 4 from the eject position to one of the first and second positions. For instance, if one of the bottons 102a, 102b, 102c and 102d is depressed while the mechanical chassis 4 is in the eject position, mode selection and shifting of the mechanical chassis to the load position are performed simultaneously.

The array also includes an eject button 103. Depressing the eject button 103 while the mechanical chassis 4 is in one of the load positions triggers the system controller to drive the motor 50 to shift the mechanical chassis 4 to the eject position. The push button 104 is a position selector button for selecting either the first load position or the second load position. This load position selector 104 triggers the system controller to actuate the mechanical chassis 4 to the load position opposite the current load position. For instance, if the mechanical chassis 4 is in the first load position, the system controller operates the motor 50 to shift the mechanical chassis to the second load position in response to depression of the load position selector 104. Conversely, when the mechanical chassis 4 is in the second load position, the mechanical chassis 4 can be returned to the first load position by depressing the load position selector 104.

The array also includes a power switch button 105. The power switch 105 is also a toggle switch between power supply and power cut-off. The power switch 105 also has the function by which when operated when the mechanical chassis is outside the first load position, i.e. while the mechanical chassis 4 is in either the eject position or the second load position, the system controller is first triggered to drive the motor 50 to shift the mechanical chassis 4 to the first load position, and then after the front mouth 5 of the recorder is closed by the movable panel 6, the system is turned OFF by cutting off the power supply.

The array also has a channel selector 106 and a clock display 107. Other operational push buttons for setting timers, auxiliary operation mode selection or so forth, and further buttons and displays for the video tape recorder may be added to the front panel as desired.

Figure 14:
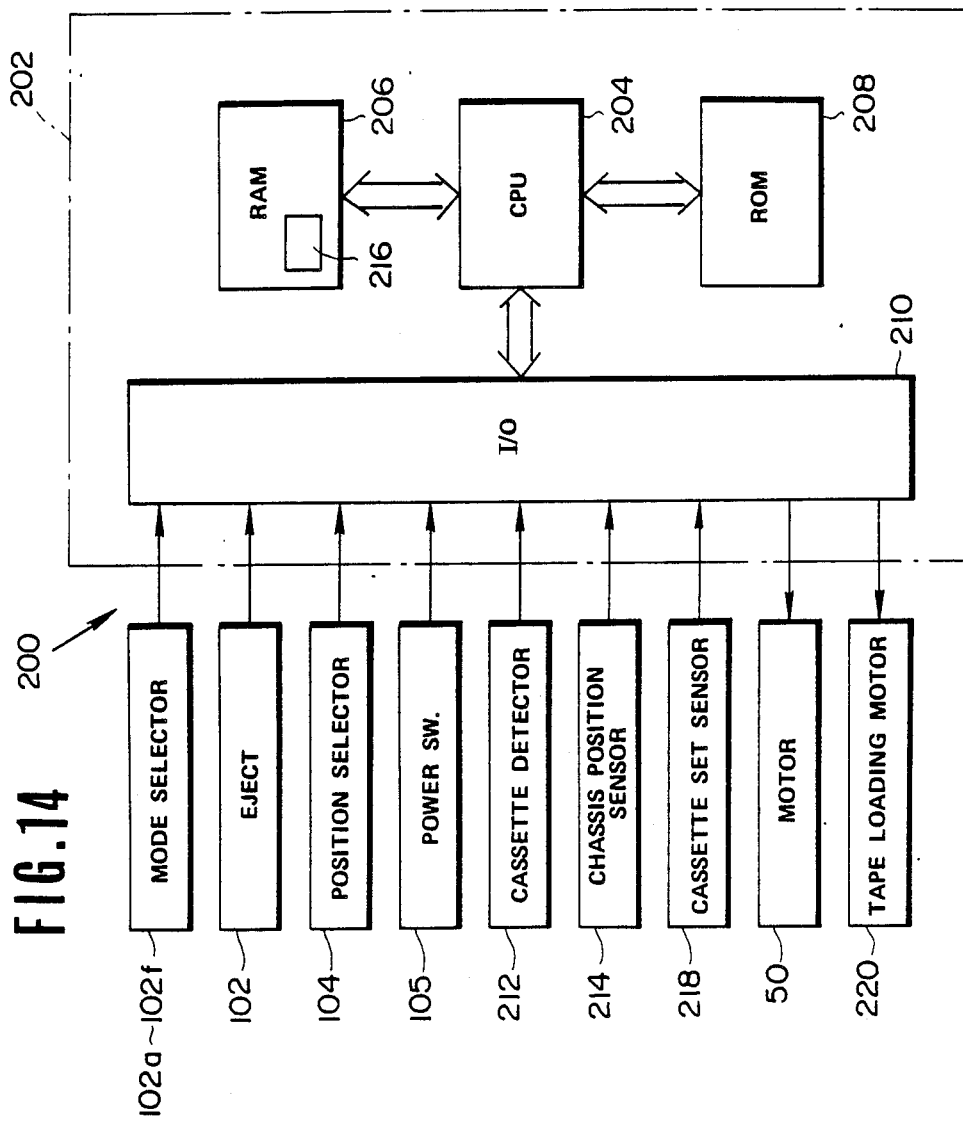
FIG. 14 is a schematic block diagram of a controller employed in the video tape recorder of FIG. 1.

Referring now to FIG. 14, the structure of the system controller 200 will be schematically described herebelow.

In general, the system controller 200 comprises a microprocessor 202 including CPU 204, RAM 206, ROM 208 and an input/output interface 210. ROM has memory blocks storing programs of FIGS. 15 to 18, which will be described later.

Other components of the system controller 200 will be described in terms of the operation of the system controller executing the programs of FIGS. 15 to 18.

Figure 15:
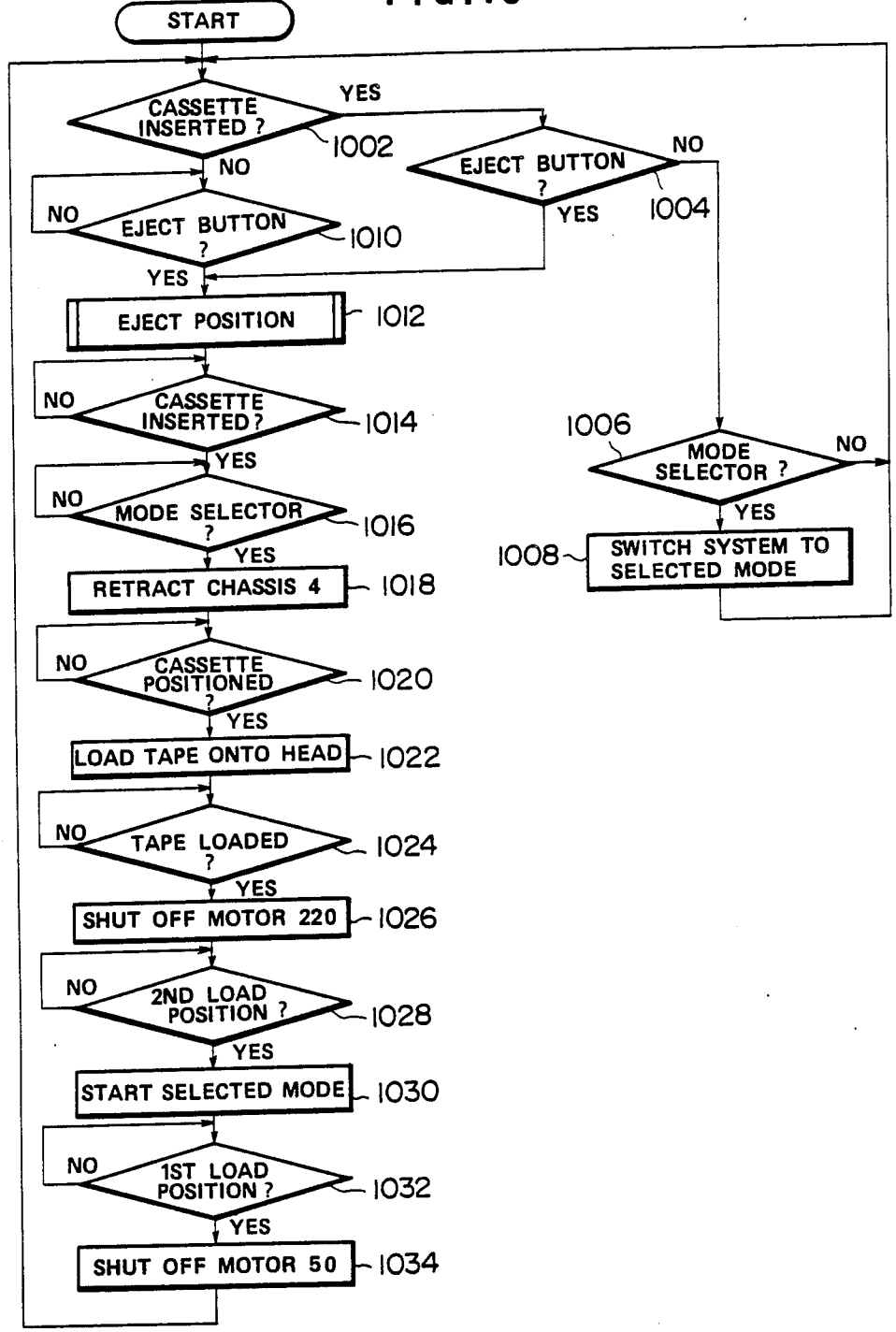
FIG. 15 is a flowchart for a main control program executed by the controller of FIG. 14.

FIG. 15 shows a control program for controlling operations of the aforementioned preferred embodiment of the video tape recorder according to the present invention. The control program may be repeatedly executed while the power switch 105 is ON.

Immediately after starting the control program, the presence of the video tape cassette is checked for by means of a cassette detector 212 at a block 1002. The cassette detector 212 may be mounted on the cassette holder 41. The cassette detector 212 outputs a detector signal indicative of the presence or absence of a video cassette in the cassette holder 41. The detector signal level is HIGH while a cassette 74 is present in the cassette holder 41 in the predetermined position. Therefore, at the block 1002, checking is performed by checking the detector signal level. When a HIGH-level detector signal is detected in the block 1002, the presence of a cassette 74 in the cassette holder is recognized. Then, operation of the eject button 103 is checked for at the block 1004. If the eject button 103 is not depressed when checked at the block 1004, operation of the mode selector buttons 102a, 102b, 102c, 102d, 102e and 102f is checked for at a block 1006. If one or more of the mode selector buttons has been depressed, operation according to selected mode is performed at a block 1008 and control returns to block 1002; otherwise control returns directly to block 1002. An example of control according to mode selection in the block 1008 will be described later.

On the other hand, if the detector signal level is LOW when checked at the block 1002, and thus the absence of a cassette 74 from the cassette holder 41 is recognized, operation of the eject button 103 is checked for again at a block 101. As set out above, since the video tape cassette 74 can be inserted only when the mechanical chassis 4 and the cassette holder 41 are in their eject positions, if the eject button 103 has not been depressed, the program loops at block 1010 until the eject button 103 is depressed. In other words, the recorder system is held in a "stand-by state".

After the eject button 103 is depressed and depression of the eject button is detected at the block 1010, then an eject operation control subroutine is executed at a block 1012. The eject operation control subroutine will be described in detail later with reference to FIG. 16.

The eject operation control program moves the mechanical chassis 4 and the cassette holder 41 to the eject position to allow insertion of a video tape cassette into the cassette holder 41. After returning from the eject operation control subroutine in the block 1012, the cassette detector signal level is again checked at a block 1014. In other words, at the eject positions of the mechanical chassis 4 and the cassette holder 41, the recorder system is held in a cassette insertion stand-by state. The program loops at the block 1014 until a HIGH-level detector signal is detected. After a HIGH-level detector signal is detected at the block 1014, operation of the mode selector buttons 102a, 102b, 102c, 102d, 102e or 102f is again checked for at a block 1016. In this case, the recorder system is held in a mode selection stand-by state by repeating a loop at block 1016. This stand-by state continues until one of the mode selector buttons 102a, 102b, 102c, 102d, 102e and 102f is depressed.

In response to depression of one of the mode selector buttons, a mechanical chassis drive control signal CS is output from the system controller so as to drive the motor 50 in the direction causing the mechanical chassis 4 to move backward to the first or second load position, at a block 1018. As the mechanical chassis 4 is retracted, the cassette holder 41 is moved to its set position to set the video tape cassette 74 in the recorder mechanism 10 on the mechanical chassis. Upon completion of the retraction operation of the mechanical chassis 4 in the block 1018, the mechanical chassis will be in one of the first and second load positions. If the load position is not the desired position, then the user will depress the load position selector 105 to change the load position from the first load position to the second load position or from the second load position to the first load position. In order to stop the mechanical chassis at the desired first or second positions, a mechanical chassis position sensor 214 is installed near the path of the mechanical chassis. The position sensor 214 may produce a mechanical chassis position indicative signal with a value depending upon the mechanical chassis position, i.e. the eject position, the first load position and the second load position. On the other hand, the system controller 200 may have a memory block 216 in RAM 204 serving as a flag register holding a flag FLpos. The flag FLpos when set is indicative of the second load position selected by operation of the load position selector 105. The second load position indicative flag FLpos will be reset in response to the next input from the load position selector 105.

After moving the mechanical chassis 4 to the desired first or second load position, the system checks to see if the video tape cassette 74 is accurately positioned on the mechanical chassis with respect to the recorder mechanism in a predetermined relationship at a block 1020. In order to check the foregoing condition, a cassette set sensor 218 mounted on the mechanical chassis is sensitive to the presence of a cassette 74 on the mechanical chassis 4 in the proper set position. The cassette set sensor 218 produces a HIGH-level cassette position signal Scas when the cassette is set accurately on the mechanical chassis 4 with respect to the recorder mechanism 10. The block 1020 loops until a HIGH-level cassette position signal from the cassette set sensor 218 is detected. After a HIHG-level cassette position signal Scas is detected at the block 1020, control passes a block 1022 in which a tape loading operation is performed. In order to load the tape onto the video head, a loading motor drive control signal CL is sent by the system controller 200 to a loading motor 220. The loading motor 220 is driven as long as the loading motor drive control signal CL remains HIGH. The loading motor drive control signal level CL remains HIGH until completion of the loading of the tape is detected at the block 1024. Upon completion of tape loading at the block 1024, the level of the loading motor drive control signal goes LOW to terminate driving of the loading motor 220, at a block 1026.

After this, the position of the mechanical chassis 4 is checked by reference to the sensor signal value of the mechanical chassis position sensor 214, at a block 1028.

It should be appreciated that the motor 50 continues to run throughout the tape loading operation. Therefore, the mechanical chassis 4 continues to move backward during execution of the blocks 1022 to 1028.

At a block 1028, the mechanical chassis position indicative signal Spos is checked to see if it indicates that the mechanical chassis has reached the second load position. This block 1028 loops until the mechanical chassis 4 passes the second load position. When the mechanical chassis's backward movement past the second load position is detected, the mode operation selected at the block 1016, is initiated at a block 1030. Even after the selected recorder mode operation starts at the block 1030, the motor 50 continues to drive the mechanical chassis 4 backward until the latter reaches the first load position. The block 1032 checks to see if the mechanical chassis has reached the first load position. After the mechanical chassis reaches the first load position at the block 1032, then the mechanical chassis drive control signal CS goes LOW at a block 1034. As a result, the motor 50 stops driving the mechanical chassis 4 at the first load position. Finally, control returns to block 1002, whereupon the program will loop through blocks 1002–1006 until the eject button is depressed.

Figure 16:
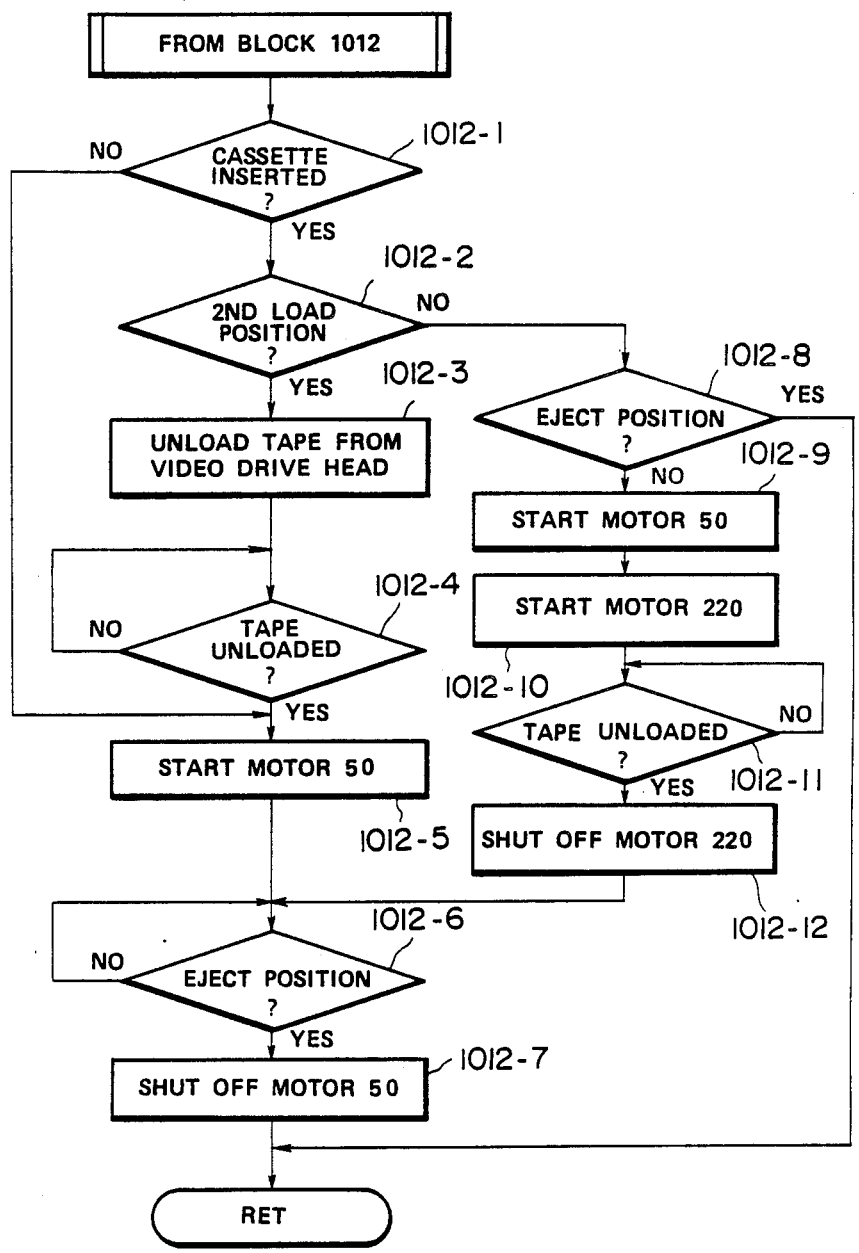
FIG. 16 is a flowchart of a subroutine of the main control program of FIG. 15, and which controls actuation of the mechanical chassis to the eject position.

FIG. 16 shows the eject operation control subroutine executed in the block 1012. Immediately after starting to execute the eject operation control subroutine, the detector signal from the cassette detector 212 is checked again at a block 1012-1. If HIGH level detector signal is detected at the block 1012-1, the mechanical chassis position indicative signal from the mechanical chassis position sensor 214 is checked to see if the mechanical chassis is in the second load position, at a block 1012-2. If the mechanical chassis is in the second load position, the tape loading control signal CL is output by the system controller to the loading motor 220 in order to unload the tape at a block 1012-3. A block 1012-4 checks to see if the unloading of the tape is completed or not. The checking operation at the block 1012-4 is repeated until the tape if fully unloaded. Thereafter, the mechanical chassis drive control signal CS is output by the system controller 200 at a block 1012-5 to energize the motor 50 to drive the mechanical chassis frontward to the eject position. The mechanical chassis is moved frontward until the mechanical chassis reaches the eject position. The mechanical chassis position sensor signal Spos is checked at a block 1012-6. The program loops at block 1012-6 until the mechanical chassis 4 reaches the eject position. After the mechanical chassis reaches the eject position, the mechanical chassis drive control signal CS is terminated to stop frontward movement of the mechanical chassis at a block 1012-7.

On the other hand, when the mechanical chassis 4 is in some position other than the second load position when checked at the block 1012-2, control passes to a block 1012-8 in which the mechanical chassis position indicative signal Spos is again checked to see if the mechanical chassis 4 is in the eject position. If the mechanical chassis is in the eject position, then control returns to the main control program of FIG. 15 immediately.

If the mechanical chassis is in a position other than the eject position when checked at the block 1012-8. In other words, if the mechanical chassis is in the first load position, the mechanical chassis drive control signal energizing the motor 50 in the direction for driving the mechanical chassis frontward is output at a block 1012-9. Immediately after or concurrently with starting the frontward movement of the mechanical chassis, the tape loading control signal CL is output by the system controller 200 to the loading motor 220 in order to unload the tape from the recorder mechanism 10, at a block 1012-10. Thereafter, a block 1012-11 checks to see if the unloading of the tape is completed or not. The block 1012-11 is repeated until the tape unloading operation is completed. Upon completion of the unloading operation, the tape loading control signal CL is terminated at a block 1012-12 in order to stop the loading motor 220. After the block 1012-12, control passes to the block 1012-6 described previously.

After the block 1012-7 set forth above, control returns to the main program of FIG. 15.

Figure 17:
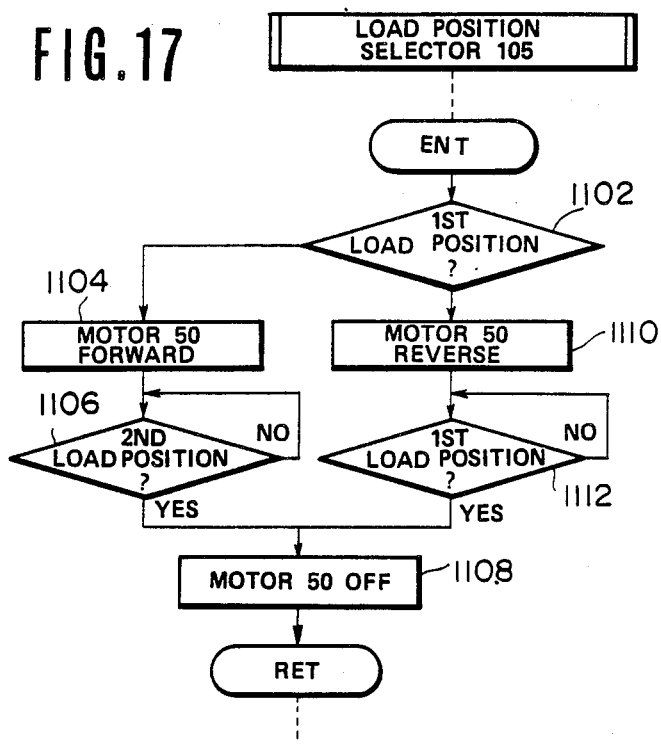
FIG. 17 is a flowchart of an interrupt program executed arbitrarily during execution of the main control program of FIG. 15, and which selects one of two load positions in the preferred embodiment of a tape loading system.

FIG. 17 shows a program which selects one of the first and second load positions in response to operation of the load position selector 105. This program may be executed as an interrupt program triggered by depression of the load position selector 105.

After starting execution, the mechanical chassis position is checked by reference to the mechanical chassis position indicative signal Spos from the mechanical chassis position sensor 214, at a block 1102. If the mechanical chassis 4 is in the first load position, control passes to a block 1104 in which the mechanical chassis drive control signal CS is output to drive the mechanical chassis 4 frontward. The mechanical chassis position is checked at a block 1106 to see whether or not the mechanical chassis has reached the second load position. The block 1106 is repeated until the mechanical chassis reaches the second load position. After the mechanical chassis reaches the second load position, the mechanical chassis drive control signal CS is terminated at a block 1108. Thus, the mechanical chassis 4 is moved to the second load position from the first load position in blocks 1104–1108.

On the other hand, if the mechanical chassis 4 is found to be in the second load position when checked at block 1102, control passes to a block 1110 in which the mechanical chassis drive control signal is output to drive the mechanical chassis backward toward the first position. During backward movement of the mechanical chassis 4, the mechanical chassis position is repeatedly checked by reference to the mechanical chassis position indicative signal Spos from the mechanical chassis position sensor 214 in block 1112. After the mechanical chassis reaches the first load position, control passes to the block 1108 to terminate the mechanical chassis drive control signal.

After the block 1108, control returns to the main program of FIG. 15.

FIG. 18 shows a program triggered by turning the power switch 105 off. After starting to execute the program of FIG. 18, the mechanical chassis position is checked at a block 1202 by reference to the mechanical chassis position indicative signal Spos from the mechanical chassis position sensor 214. If the mechanical chassis 4 is in the first load position when checked at the block 1202, then power supply is terminated at a block 1204. On the other hand, if the mechanical chassis is in a position other than the first load position, the mechanical chassis drive control signal CS is output at a block 1206 to drive the mechanical chassis backward toward the first load position. After starting the motor 50 to drive the mechanical chassis 4 backward, control returns to the block 1202 to check the mechanical chassis position. The loop of the blocks 1202 and 1206 is repeated until the mechanical chassis 4 reaches the first position. After the mechanical chassis reaches the first load position, then control passes to the block 1304 in which the power supply is turned off.

While the present invention has been disclosed in detail in terms of the specific embodiment of the invention, the invention should be appreciated as being capable of embodiment in various ways. Also, the specific embodiment disclosed hereabove can be modified in many ways without departing from the principle of the invention. Therefore, the invention should be understood to include all possible embodiments and modifications of the preferred embodiment encompassed by the principles set out in the appended claims.

What is claimed is:

1. A tape recorder comprising:
 a recorder housing;
 a mechanical chassis on which a recorder mechanism for recording and reproduction is mounted, said recording mechanism being adapted to receive a tape cassette including a tape serving as recording medium, wherein said mechanical chassis is able to move horizontally between an eject position in which it protrudes from said recorder housing to receive and eject said tape cassette and a first loading position housed within said recorder housing and in which said tape is received by said recorder mechanism for recording and reproduction and a second loading position to hold said tape cassette so that said tape cassette can be exposed to the outside of said recorder housing and that said tape is maintained at a loaded position for recording and reproduction; and
 means for driving said mechanical chassis to move between said eject position, said first loading position and said loading position.

2. The tape recorder set forth in claim 1, which further comprises a guide means asociated with said mechanical chassis and extending horizontally parallel to said recorder housing for guiding said mechanical chassis to move between said eject position, said first loading position and a second loading position.

3. The tape recorder set forth in claim 2, which further comprises a cassette holder disposed on said mechanical chassis for movement with the latter, said cassette holder being movable relative to said mechanical chassis between a first position in which a front end of said cassette holder is tilted upwardly away from said mechanical chassis to receive said tape, and a second position in which said cassette holder lies atop said mechanical chassis whereby said recorder mechanism receives the tape; and means for driving said cassette holder between said first and second positions.

4. The tape recorder set forth in claim 3, which further comprises means for coupling said cassette holder to said mechanical chassis such that said cassette holder moves between its first and second positions according to the movement of said mechanical chassis.

5. The tape recorder set forth in claim 4, wherein said coupling means operates said cassette holder to its first position when said mechaical chassis is in its eject position, and to its second position when said mechanical chassis is in its first loading position.

6. The tape recorder set forth in claim 2, wherein said mechanical chassis can also move to a third position between said first and second positions and in which part of said mechanical chassis protrudes from said recorder housing and the tape is received by the recorder mechanism for recording and reproduction of signals.

7. The tape recorder as set forth in claim 6, which further comprises a cassette holder disposed on said mechanical chassis for movement with the latter, said cassette holder being movable relative to said mechanical chassis between a first position in which a front end of said cassette holder is tilted upwardly away from said mechanical chassis to receive said tape, and a second position in which said cassette holder lies atop said mechanical chassis whereby said recorder mechanism receives the tape; and means for driving said cassette holder between said first and second positions.

8. The tape recorder as set forth in claim 7, which further comprises means for coupling said cassette holder to said mechanical chassis such that said cassette holder moves between its first and second positions according to the movement of said mechanical chassis.

9. The tape recorder as set forth in claim 8, wherein said coupling means operates said cassette holder to its first loading position when said mechanical chassis is in its first position, and to its second position when said mechanical chassis is in its second loading position.

10. The tape recorder as set forth in claim 9, wherein said mechanical chassis driving means comprises a first drive mechanism associated with said mechanical chassis for driving said mechanical chassis along said guide means reciprocably frontward and backward.

11. The tape recorder as set forth in claim 8, which further comprises manually operable push buttons for controlling operation of the tape recorder, said push buttons including at least one operational mode selector button through which one recorder operation is triggered, said operational mode selector button also triggering said driving motor to operate said mechanical chassis and said cassette holder.

12. The tape recorder as set forth in claim 11, wherein said push buttons include an eject button for triggering said driving motor to drive said mechanical chassis frontward to said first loading position and operate said cassette holder to said first position.

13. The tape recorder as set forth in claim 12, which further comprises a system controller controlling operation of said driving motor and said recorder mechanism, said system controller includes a first sensor detecting the presence or absence of said cassette in said cassette holder, and a second sensor for detecting the position of said mechanical chassis, said system controller being associated with said push buttons for controlling operations on the basis of the first and second sensor signals from said first and second sensors and selected operation mode of said recorder mechanism.

14. The tape recorder as set forth in claim 10, wherein said cassette holder driving means comprises a second drive mechanism asosciated with said cassette holder for operating the latter between its first and second position.

15. The tape recorder as set forth in claim 14, wherein said first and second drive mechanisms have a common driving motor.

16. The tape recorder set forth in claim 15, wherein said common driving motor is associated with said first drive mechanism through a first power train and with said second drive mechanism through a second power train, said first and second power trains cooperating for selectively transmitting driving force to said first and-/or second drive mechanisms for selectively driving said mechanical chassis and/or said cassette holder.

17. The tape recorder set forth in claim 1, which further comprises a cassette holder disposed on said mechanical chassis for movement with the latter, said cassette holder being movable relative to said mechanical chassis between a first position in which a front end of said cassette holder is tilted upwardly away from said mechanical chassis to receive said tape, and a second position in which said cassette holder lies atop said mechanical chassis whereby said recorder mechanism receives the tape; and means for driving said cassette holder between said first and second positions.

18. The tape recorder set forth in claim 17, which further comprises means for coupling said cassette holder to said mechanical chassis such that said cassette holder moves between its first and second positions according to the movement of said mechanical chassis.

19. The tape recorder set forth in claim 18, wherein said coupling means operates said cassette holder to its first position when said mechanical chassis is in its eject position, and to its second position when said mechanical chasssis is in its first loading position.

20. The tape recorder as set forth in claim 19, wherein said mechanical chassis driving means comprises a first drive mechanism associated with said mechanical chassis for driving said mechanical chassis along said guide means reciprocably frontward and backward.

21. The tape recorder as set forth in claim 20 wherein said cassette holder driving means comprises a second drive mechanism associated with said cassette holder for operating the latter between its first and second position.

22. The tape recorder as set forth in claim 21, wherein said first and second drive mechanisms have a common driving motor.

23. The tape recorder as set forth in claim 22, wherein said common driving motor is associated with said first drive mechanism through a first power train and with said second drive mechanism through a second power train, said first and second power trains cooperating for selectively transmitting driving force to said first and-/or second drive mechanisms for selectively driving said mechanical chassis and/or said cassette holder.

24. The tape recorder as set forth in claim 19, which further comprises manually operable push buttons for controlling operation of the tape recorder, said push buttons including at least one operational mode selector button through which one recorder operation is triggered, said operational mode selector button also triggering said driving motor to operate said mechanical chassis and said cassette holder.

25. The tape recorder as set forth in claim 24, wherein said push buttons include an eject button for triggering said driving motor to drive said mechanical chassis frontward to said first loading position and operate said cassette holder to said first position.

26. The tape recorder as set forth in claim 25, which further comprises a system controller controlling operation of said driving motor and said recorder mechanism, said system controller includes a first sensor detecting the presence or absence of said cassette in said cassette holder, and a second sensor for detecting the position of said mechanical chassis, said system controller being associated with said push buttons for controlling operations on the basis of the first and second sensor signals from said first and second sensors and selected operation mode of said recorder mechanism.

27. The tape recorder as set forth in claim 1, wherein said tape recorder is a video tape recorder, said tape is a video tape, and said tape cassette is a video tape cassette.

* * * * *